United States Patent
Li et al.

(10) Patent No.: US 11,329,771 B2
(45) Date of Patent: May 10, 2022

(54) DL HARQ TIMING WITH SHORT TTI OPERATIONS IN TDD

(71) Applicant: Telefonaktiebolaget LM Ericsson (publ), Stockholm (SE)

(72) Inventors: Jingya Li, Gothenburg (SE); Laetitia Falconetti, Järfälla (SE); Daniel Larsson, Lund (SE); Henrik Sahlin, Mölnlycke (SE); Gustav Wikström, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/323,590

(22) PCT Filed: Aug. 10, 2017

(86) PCT No.: PCT/IB2017/054891
§ 371 (c)(1),
(2) Date: Feb. 6, 2019

(87) PCT Pub. No.: WO2018/029634
PCT Pub. Date: Feb. 15, 2018

(65) Prior Publication Data
US 2020/0052836 A1     Feb. 13, 2020

Related U.S. Application Data

(60) Provisional application No. 62/374,372, filed on Aug. 12, 2016.

(51) Int. Cl.
*H04L 1/18*     (2006.01)
*H04L 5/00*     (2006.01)
(Continued)

(52) U.S. Cl.
CPC .......... *H04L 1/1887* (2013.01); *H04L 5/0055* (2013.01); *H04L 5/14* (2013.01); *H04W 72/0446* (2013.01); *H04W 72/1252* (2013.01)

(58) Field of Classification Search
CPC .......... H04L 1/18; H04L 5/0055; H04L 5/14; H04W 72/0446; H04W 72/1252
See application file for complete search history.

(56) References Cited

U.S. PATENT DOCUMENTS

| 2009/0181689 A1 | 7/2009 | Lee et al. |
| 2010/0182939 A1 | 6/2010 | Ojala et al. |
(Continued)

FOREIGN PATENT DOCUMENTS

| CN | 103138903 A | 6/2013 |
| EP | 3043502 A1 | 7/2016 |
(Continued)

OTHER PUBLICATIONS

Author Unknown, "Technical Specification Group Radio Access Network; Evolved Universal Terrestrial Radio Access (E-UTRA); Physical channels and modulation (Release 13)," Technical Specification 36.211, Version 13.0.0, 3GPP Organizational Partners, Dec. 2015, 141 pages.
(Continued)

*Primary Examiner* — Kent Krueger
(74) *Attorney, Agent, or Firm* — Christopher & Weisberg, P.A.

(57) ABSTRACT

Systems and methods for determining and utilizing downlink Hybrid Automatic Repeat Request (HARQ) timing when using short Transmit Time Intervals (sTTIs) are disclosed. In some embodiments, a method of operation of a wireless device in a cellular communications network comprises determining a downlink HARQ timing k for transmission of downlink HARQ feedback for a downlink trans-
(Continued)

mission received in a downlink sTTI $n_{DL}$ based on a Time Division Duplexing (TDD) uplink/downlink configuration and transmitting, in an uplink sTTI $n_{DL}$+k, downlink HARQ feedback for the downlink transmission received in the downlink sTTI $n_{DL}$. In this manner, downlink HARQ timing is determined and utilized when using sTTIs.

11 Claims, 18 Drawing Sheets

(51) Int. Cl.
*H04W 72/04* (2009.01)
*H04W 72/12* (2009.01)
*H04L 5/14* (2006.01)

(56) References Cited

U.S. PATENT DOCUMENTS

| | | | |
|---|---|---|---|
| 2013/0223298 | A1 | 8/2013 | Ahn et al. |
| 2013/0272169 | A1 | 10/2013 | Wang et al. |
| 2013/0301490 | A1 | 11/2013 | He et al. |
| 2014/0029490 | A1 | 1/2014 | Kim et al. |
| 2014/0092789 | A1 | 4/2014 | Lei et al. |
| 2014/0092794 | A1 | 4/2014 | Fang et al. |
| 2014/0112217 | A1 | 4/2014 | Ahn et al. |
| 2014/0269451 | A1 | 9/2014 | Papasakellariou et al. |
| 2014/0293843 | A1 | 10/2014 | Papasakellariou et al. |
| 2015/0208407 | A1 | 7/2015 | Yang et al. |
| 2015/0244485 | A1* | 8/2015 | Nguyen ................ H04L 1/1812 370/280 |
| 2015/0365965 | A1 | 12/2015 | Wu et al. |
| 2016/0013902 | A1 | 1/2016 | Cui et al. |
| 2016/0020891 | A1 | 1/2016 | Jung et al. |
| 2016/0021659 | A1* | 1/2016 | Yang ................ H04W 72/0413 370/280 |
| 2016/0119948 | A1 | 4/2016 | Damnjanovic et al. |
| 2016/0182213 | A1 | 6/2016 | Golitschek Edler von Elbwart et al. |
| 2016/0198461 | A1 | 7/2016 | Su |
| 2016/0360550 | A1 | 12/2016 | Chen et al. |
| 2017/0223702 | A1* | 8/2017 | Yin ........................ H04L 1/1812 |
| 2017/0332365 | A1 | 11/2017 | Lin et al. |
| 2017/0332377 | A1* | 11/2017 | Tseng ................ H04W 72/0413 |
| 2017/0332386 | A1 | 11/2017 | Li et al. |
| 2017/0366311 | A1* | 12/2017 | Iyer ...................... H04B 7/0482 |
| 2018/0359068 | A1* | 12/2018 | Kim ...................... H04W 72/14 |
| 2018/0376497 | A1 | 12/2018 | You et al. |
| 2019/0068334 | A1* | 2/2019 | Stern-Berkowitz ......................... H04L 1/1812 |
| 2019/0104520 | A1 | 4/2019 | Kim et al. |
| 2019/0150171 | A1* | 5/2019 | Hwang .................... H04L 1/18 370/329 |
| 2019/0191434 | A1* | 6/2019 | Hugl .................... H04L 5/0096 |
| 2019/0223204 | A1* | 7/2019 | Kim ........................ H04B 1/00 |

FOREIGN PATENT DOCUMENTS

| | | | |
|---|---|---|---|
| EP | 3076734 | A1 | 10/2016 |
| WO | 2012171553 | A1 | 12/2012 |
| WO | 2014089107 | A1 | 6/2014 |
| WO | 2015079926 | A1 | 6/2015 |
| WO | 2015100136 | A1 | 7/2015 |
| WO | 2018029636 | A1 | 2/2018 |
| WO | 2018029637 | A1 | 2/2018 |

OTHER PUBLICATIONS

Author Unknown, "Technical Specification Group Radio Access Network; Evolved Universal Terrestrial Radio Access (E-UTRA); Physical layer procedures (Release 13)," Technical Specification 36.213, Version 13.0.1, 3GPP Organizational Partners, Jan. 2016, 326 pages.
CMCC, "R1-164884: Discussion on PUSCH transmission for UpPTS," Third Generation Partnership Project (3GPP), TSG RAN WG1 Meeting #85, May 23-27, 2016, 3 pages, Nanjing, China.
CMCC, "R1-164885: Discussion on latency reduction for TDD," Third Generation Partnership Project (3GPP), TSG RAN WG1 Meeting #85, May 23-27, 2016, 3 pages, Nanjing, China.
Ericsson, "R1-163326: On processing time reduction and related procedures," Third Generation Partnership Project (3GPP), TSG RAN WG1 Meeting #84 bis, Apr. 11-15, 2016, 6 pages, Busan.
Ericsson, "R1-167495: TDD aspects of short TTI," Third Generation Partnership Project (3GPP), TSG-RAN WG1 #86, Aug. 22-26, 2016, 3 pages, Goteborg, Sweden.
Ericsson, "R1-167501: Supported HARQ timings for 1ms TTI and reduced processing time," Third Generation Partnership Project (3GPP), TSG-RAN WG1 #86, Aug. 22-26, 2016, 3 pages, Goteborg, Sweden.
Ericsson, "R1-1708868: FS2 aspects of short TTI," Third Generation Partnership Project (3GPP), TSG-RAN WG1 Meeting #89, May 15-19, 2017, 5 pages, Hangzhou, P.R. China.
Huawei, et al., "R1-162115: Short TTI for UL transmissions," Third Generation Partnership Project (3GPP), TSG RAN WG1 Meeting #84bis, Apr. 11-15, 2016, 4 pages, Busan, Korea.
Nokia Networks, "R1-157292: On Shorter TTI for Latency Reduction," Third Generation Partnership Project (3GPP), TSG-RAN WG1 Meeting #83, Nov. 15-22, 2015, 4 pages, Anaheim, USA.
Samsung, "R1-156822: Study on specification impact for uplink due to TTI shortening," Third Generation Partnership Project (3GPP), TSG RAN WG1 #83, Nov. 15-22, 2015, 3 pages, Anaheim, USA.
International Search Report and Written Opinion for International Patent Application No. PCT/IB2017/054891, dated Nov. 10, 2017, 19 pages.
Written Opinion for International Patent Application No. PCT/IB2017/054891, dated Jul. 16, 2018, 6 pages.
International Preliminary Report on Patentability for International Patent Application No. PCT/IB2017/054891, dated Nov. 6, 2018, 10 pages.
International Search Report and Written Opinion for International Patent Application No. PCT/IB2017/054893, dated Dec. 1, 2017, 21 pages.
Written Opinion for International Patent Application No. PCT/IB2017/054893, dated Jul. 4, 2018, 10 pages.
International Preliminary Report on Patentability for International Patent Application No. PCT/IB2017/054893, dated Nov. 9, 2018, 9 pages.
International Search Report and Written Opinion for International Patent Application No. PCT/IB2017/054894, dated Nov. 16, 2017, 18 pages.
Written Opinion for International Patent Application No. PCT/IB2017/054894, dated Jul. 13, 2018, 6 pages.
International Preliminary Report on Patentability for International Patent Application No. PCT/IB2017/054894, dated Nov. 19, 2018, 33 pages.
Final Office Action and Applicant-Initiated Interview Summary for U.S. Appl. No. 16/323,605, dated Aug. 19, 2020, 21 pages.
Notice of Allowance for U.S. Appl. No. 16/323,617, dated Aug. 5, 2020, 10 pages.
Intention to Grant for European Patent Application No. 17768232.5, dated May 11, 2020, 111 pages.
Intention to Grant for European Patent Application No. 17767927.1, dated May 27, 2020, 115 pages.
Non-Final Office Action for U.S. Appl. No. 16/323,605, dated Mar. 17, 2020, 19 pages.
Non-Final Office Action for U.S. Appl. No. 16/323,617, dated Feb. 24, 2020, 21 pages.
First Office Action for Chinese Patent Application No. 201780063390.9, dated Apr. 22, 2021, 9 pages.

* cited by examiner

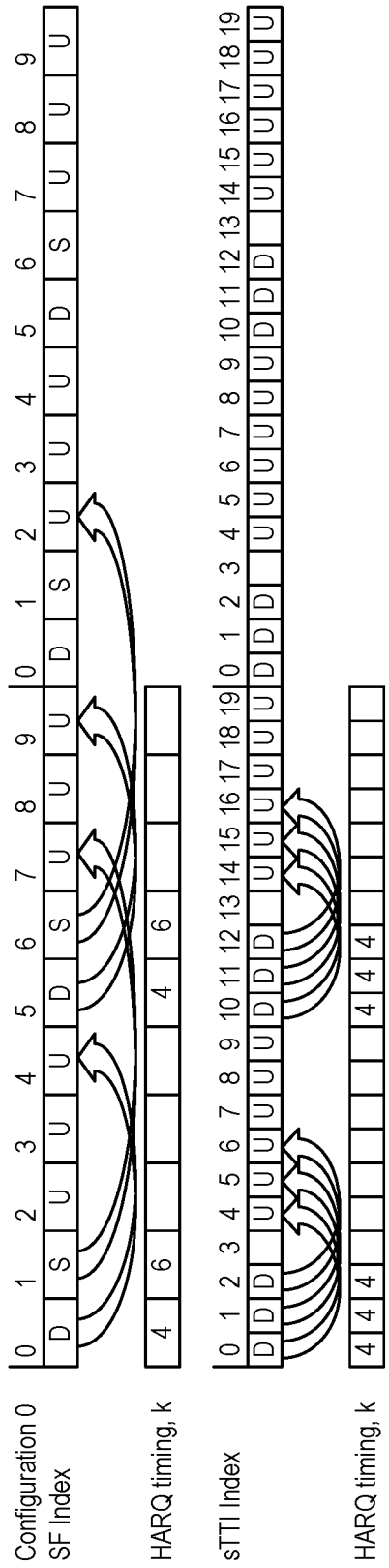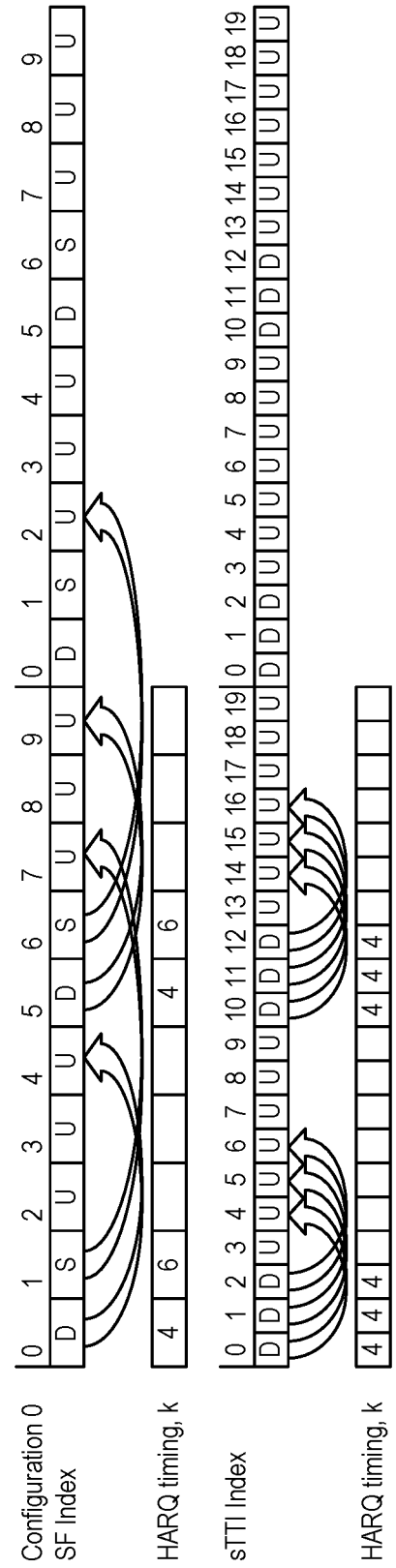
FIG. 3
DL HARQ-TIMING FOR TDD DL/UL CONFIGURATION 0, UpPTS IS NOT USED FOR SENDING DL HARQ-ACK
FIG. 4
DL HARQ-TIMING FOR TDD DL/UL CONFIGURATION 0, UpPTS IS USED FOR SENDING DL HARQ-ACK DL HARQ-TIMING FOR TDD DL/UL CONFIGURATION 1, UpPTS IS NOT USED FOR SENDING DL HARQ-ACK DL HARQ-TIMING FOR TDD DL/UL CONFIGURATION 1, UpPTS IS USED FOR SENDING DL HARQ-ACK DL HARQ-TIMING FOR TDD DL/UL CONFIGURATION 2, UpPTS IS NOT USED FOR SENDING DL HARQ-ACK DL HARQ-TIMING FOR TDD DL/UL CONFIGURATION 2, UpPTS IS USED FOR SENDING DL HARQ-ACK DL HARQ-TIMING FOR TDD DL/UL CONFIGURATION 3, UpPTS IS NOT USED FOR SENDING DL HARQ-ACK DL HARQ-TIMING FOR TDD DL/UL CONFIGURATION 3, UpPTS IS USED FOR SENDING DL HARQ-ACK DL HARQ-TIMING FOR TDD DL/UL CONFIGURATION 4, UpPTS IS NOT USED FOR SENDING DL HARQ-ACK DL HARQ-TIMING FOR TDD DL/UL CONFIGURATION 4, UpPTS IS USED FOR SENDING DL HARQ-ACK DL HARQ-TIMING FOR TDD DL/UL CONFIGURATION 5, UpPTS IS NOT USED FOR SENDING DL HARQ-ACK DL HARQ-TIMING FOR TDD DL/UL CONFIGURATION 5, UpPTS IS USED FOR SENDING DL HARQ-ACK DL HARQ-TIMING FOR TDD DL/UL CONFIGURATION 6, UpPTS IS NOT USED FOR SENDING DL HARQ-ACK DL HARQ-TIMING FOR TDD DL/UL CONFIGURATION 6, UpPTS IS USED FOR SENDING DL HARQ-ACK

DL HARQ TIMING WITH SHORT TTI OPERATIONS IN TDD

RELATED APPLICATIONS

This application is a 35 U.S.C. § 371 national phase filing of International Application No. PCT/IB2017/054891, filed Aug. 10, 2017, which claims the benefit of provisional patent application Ser. No. 62/374,372, filed Aug. 12, 2016, the disclosures of which are hereby incorporated herein by reference in their entireties.

TECHNICAL FIELD

The present disclosure relates to downlink Hybrid Automatic Repeat Request (HARQ) timing.

BACKGROUND

In Third Generation Partnership Project (3GPP) Technical Specification (TS) 36.211, three radio frame structures are supported. Frame Structure (FS) type 1 (FS 1) is applicable to Frequency Division Duplexing (FDD) only, FS type 2 (FS 2) is applicable to Time Division Duplexing (TDD) only, and FS type 3 (FS 3) is applicable to License Assisted Access (LAA) secondary cell operation only.

With FS 2 for TDD, each radio frame of length 10 milliseconds (ms) consists of two half-frames of length 5 ms each. Each half-frame consists of five Subframes (SFs) of length 1 ms. Each SF is defined by two slots of length 0.5 ms each. Within each radio frame, a subset of SFs are reserved for uplink transmissions, and the remaining SFs are allocated for downlink transmissions, or for special SFs, where the switch between downlink and uplink occurs.

As shown in Table 1, copied from table 4.2-1 of 3GPP TS 36.211 V13.0.0, seven different downlink/uplink configurations are supported for FS 2. Here, "D" denotes a downlink SF, "U" denotes an uplink SF, and "S" represents a special SF. Configurations 0, 1, 2, and 6 have 5 ms downlink-to-uplink switch-point periodicity, with the special SF existing in both SF 1 and SF 6. Configurations 3, 4, and 5 have 10 ms downlink-to-uplink switch-point periodicity, with the special SF in SF 1 only.

TABLE 1

Downlink/Uplink Configurations

| DL/UL configuration | DL-to-UL Switch-point periodicity | SF number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A special SF is split into three parts: a downlink part (Downlink Part of a Special Subframe (DwPTS)), Guard Period (GP), and an Uplink Part of a Special Subframe (UpPTS). The DwPTS with duration of more than three symbols can be treated as a normal downlink SF for data transmission. However, the UpPTS is not used for data transmission due to the very short duration in the first releases of Long Term Evolution (LTE). Instead, UpPTS can be used for channel sounding or random access. In LTE Release 14 the possibility of using UpPTS for data transmission will be specified for a specific special SF configuration.

Typically, the downlink/uplink configuration and the configuration of the special SF used in a cell are signaled as part of the system information, which is included in System Information Block 1 (SIB1) and broadcasted every 80 ms within SF 5.

Hybrid Automatic Repeat Request (HARQ) timing is defined as the time relation between the reception of data in a certain HARQ process and the transmission of the HARQ acknowledgement. Based on this timing, the receiver is able to know to which HARQ process a received acknowledgement is associated.

In TDD, an uplink HARQ acknowledgement is only allowed to be transmitted in an uplink SF, and a downlink HARQ acknowledgement is only possible in Physical HARQ Indicator Channel (PHICH) of downlink SF and DwPTS. The HARQ acknowledgement of a transport block in SF n is transmitted in SF n+k, where k≥4. The value of k depends on the downlink/uplink configuration, and is given in Table 2 and Table 3 for downlink and uplink transmissions, respectively [3GPP TS 36.213 V13.0.1].

TABLE 2

HARQ Timing k for Downlink Transmissions

| TDD DL/UL configuration | SF index n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | — | — | — | 4 | 6 | — | — | — |
| 1 | 7 | 6 | — | — | 4 | 7 | 6 | — | — | 4 |
| 2 | 7 | 6 | — | 4 | 8 | 7 | 6 | — | 4 | 8 |
| 3 | 4 | 11 | — | — | — | 7 | 6 | 6 | 5 | 5 |
| 4 | 12 | 11 | — | — | 8 | 7 | 7 | 6 | 5 | 4 |
| 5 | 12 | 11 | — | 9 | 8 | 7 | 6 | 5 | 4 | 13 |
| 6 | 7 | 7 | — | — | — | 7 | 7 | — | — | 5 |

TABLE 3

HARQ Timing k for Uplink Transmissions

| TDD DL/UL configuration | SF index n | | | | | | | | | |
|---|---|---|---|---|---|---|---|---|---|---|
| | 0 | 1 | 2 | 3 | 4 | 5 | 6 | 7 | 8 | 9 |
| 0 | — | — | 4 | 7 | 6 | — | — | 4 | 7 | 6 |
| 1 | — | — | 4 | 6 | — | — | — | 4 | 6 | — |
| 2 | — | — | 6 | — | — | — | — | 6 | — | — |
| 3 | — | — | 6 | 6 | 6 | — | — | — | — | — |
| 4 | — | — | 6 | 6 | — | — | — | — | — | — |
| 5 | — | — | 6 | — | — | — | — | — | — | — |
| 6 | — | — | 4 | 6 | 6 | — | — | 4 | 7 | — |

Packet data latency is one of the performance metrics that vendors, operators, and also end-users (via speed test applications) regularly measure. Latency measurements are done in all phases of a radio access network system lifetime, when verifying a new software release or system component, when deploying a system, and when the system is in commercial operation.

Shorter latency than previous generations of 3GPP Radio Access Technologies (RATs) was one performance metric that guided the design of LTE. LTE is also now recognized by the end-users to be a system that provides faster access to the Internet and lower data latencies than previous generations of mobile radio technologies.

Packet data latency is important not only for the perceived responsiveness of the system; it is also a parameter that indirectly influences the throughput of the system. Hypertext Transfer Protocol (HTTP)/Transmission Control Protocol (TCP) is the dominating application and transport layer protocol suite used on the Internet today. According to HTTP Archive (http://httparchive.org/trends.php), the typical size of HTTP based transactions over the Internet are in the range of a few tens of kilobytes up to one megabyte. In this size range, the TCP slow start period is a significant part of the total transport period of the packet stream. During TCP slow start the performance is latency limited. Hence, improved latency can rather easily be showed to improve the average throughput for this type of TCP based data transactions.

Radio resource efficiency could be positively impacted by latency reductions. Lower packet data latency could increase the number of transmissions possible within a certain delay bound; hence higher Block Error Rate (BLER) targets could be used for the data transmissions freeing up radio resources potentially improving the capacity of the system.

One area to address when it comes to packet latency reductions is the reduction of transport time of data and control signaling by addressing the length of a Transmission Time Interval (TTI). In LTE Release 8, a TTI corresponds to one SF of length 1 ms. One such 1 ms TTI is constructed by using 14 Orthogonal Frequency Division Multiplexing (OFDM) or Single Carrier Frequency Division Multiple Access (SC-FDMA) symbols in the case of normal cyclic prefix and 12 OFDM or SC-FDMA symbols in the case of extended cyclic prefix. In LTE Release 13, a study item was started in 2015 with the goal of specifying transmissions with shorter TTIs that are much shorter than the LTE Release 8 TTI.

The short TTI (sTTI) can be decided to have any duration in time and comprise resources on a number of OFDM or SC-FDMA symbols within a 1 ms SF. As one example, the duration of the sTTI may be 0.5 ms, i.e. seven OFDM or SC-FDMA symbols for the case with normal cyclic prefix. In that case the short TTI transmission is equivalent to (i.e., can be referred to as) a slot transmission. Another example is a sTTI of only two OFDM or SC-FDMA symbols. In that case the short TTI transmission is equivalent to a subslot transmission.

SUMMARY

Systems and methods for determining and utilizing downlink Hybrid Automatic Repeat Request (HARQ) timing when using short Transmit Time Intervals (sTTIs) are disclosed. In some embodiments, a method of operation of a wireless device in a cellular communications network comprises determining a downlink HARQ timing k for transmission of downlink HARQ feedback for a downlink transmission received in a downlink sTTI $n_{DL}$ based on a Time Division Duplexing (TDD) uplink/downlink configuration and transmitting, in an uplink sTTI $n_{DL}+k$, downlink HARQ feedback for the downlink transmission received in the downlink sTTI $n_{DL}$. In this manner, downlink HARQ timing is determined and utilized when using sTTIs.

In some embodiments, the downlink HARQ timing k is a smallest integer number of sTTIs that is larger than or equal to a predefined minimum downlink HARQ timing value such that sTTI $n_{DL}+k$ is an uplink sTTI.

In some embodiments, determining the downlink HARQ timing k comprises determining the downlink HARQ timing k in such a manner that an uplink part of special SFs are treated as uplink sTTIs. In some other embodiments, determining the downlink HARQ timing k comprises determining the downlink HARQ timing k in such a manner that an uplink part of special SFs are not treated as uplink sTTIs.

In some embodiments, determining the downlink HARQ timing k comprises determining the downlink HARQ timing k in accordance with a latency optimization scheme. In some other embodiments, determining the downlink HARQ timing k comprises determining the downlink HARQ timing k in accordance with a load balancing scheme.

In some embodiments, determining the downlink HARQ timing k comprises determining the downlink HARQ timing k based on a predefined table that defines values of k for different values of $n_{DL}$ for the TDD uplink/downlink configuration. Further, in some embodiments, the predefined table defines the values of k for the different values of n for the TDD uplink/downlink configuration in such a manner that an uplink part of special SFs are treated as uplink sTTIs. In some other embodiments, the predefined table defines the values of k for the different values of n for the TDD uplink/downlink configuration in such a manner that an uplink part of special SFs are not treated as uplink sTTIs. In some embodiments, the predefined table defines the values of k for the different values of $n_{DL}$ in accordance with a latency optimization scheme. In some other embodiments, the predefined table defines the values of k for the different values of $n_{DL}$ in accordance with a load sharing scheme.

In some embodiments, an uplink sTTI can carry downlink HARQ feedback for the downlink transmission received in multiple sTTIs.

In some embodiments, the downlink sTTI $n_{DL}$ and the uplink sTTI $n_{DL}+k$ each have a duration of less than 1 millisecond (ms). In some other embodiments, the downlink sTTI $n_{DL}$ and the uplink sTTI $n_{DL}+k$ each have a duration of less than 0.5 ms.

Embodiments of a wireless device for a cellular communications network are also disclosed. In some embodiments, a wireless device for a cellular communications network is adapted to determine a downlink HARQ timing k for transmission of downlink HARQ feedback for a downlink transmission received in a downlink sTTI $n_{DL}$ based on a TDD uplink/downlink configuration and transmit, in an uplink sTTI $n_{DL}+k$, downlink HARQ feedback for the downlink transmission received in the downlink sTTI $n_{DL}$.

In some embodiments, a wireless device in a cellular communications network comprises at least one transceiver, at least one processor, and memory comprising instructions executable by the at least one processor whereby the wireless device is operable to determine a downlink HARQ timing k for transmission of downlink HARQ feedback for a downlink transmission received in a downlink short TTI $n_{DL}$ based on a TDD uplink/downlink configuration and transmit, in an uplink short TTI $n_{DL}+k$, downlink HARQ feedback for the transmission received in the downlink short TTI $n_{DL}$.

In some embodiments, a wireless device for a cellular communications network comprises a determining module operable to determine a downlink HARQ timing k for transmission of downlink HARQ feedback for a downlink transmission received in a downlink sTTI $n_{DL}$ based on a TDD uplink/downlink configuration and a transmitting module operable to transmit, in an uplink sTTI $n_{DL}+k$, downlink HARQ feedback for the downlink transmission received in the downlink sTTI $n_{DL}$.

Embodiments of a method of operation of a radio access node in a cellular communications network are also disclosed. In some embodiments, a method of operation of a radio access node in a cellular communications network comprises transmitting a downlink transmission to a wireless device in a downlink sTTI $n_{DL}$, determining, based on a TDD uplink/downlink configuration, a downlink HARQ timing k for reception of downlink HARQ feedback from the wireless device for the downlink transmission transmitted in the downlink sTTI $n_{DL}$, and receiving, in an uplink sTTI $n_{DL}+k$, downlink HARQ feedback from the wireless device for the downlink transmission transmitted to the wireless device in the downlink sTTI $n_{DL}$.

In some embodiments, the downlink HARQ timing k is a smallest integer number of sTTIs that is larger than or equal to a predefined minimum downlink HARQ timing value such that sTTI $n_{DL}+k$ is an uplink sTTI.

In some embodiments, determining the downlink HARQ timing k comprises determining the downlink HARQ timing k in such a manner that an uplink part of special SFs are treated as uplink sTTIs. In some other embodiments, determining the downlink HARQ timing k comprises determining the downlink HARQ timing k in such a manner that an uplink part of special SFs are not treated as uplink sTTIs.

In some embodiments, determining the downlink HARQ timing k comprises determining the downlink HARQ timing k in accordance with a latency optimization scheme. In some other embodiments, determining the downlink HARQ timing k comprises determining the downlink HARQ timing k in accordance with a load balancing scheme.

In some embodiments, determining the downlink HARQ timing k comprises determining the downlink HARQ timing k based on a predefined table that defines values of k for different values of $n_{DL}$ for the TDD uplink/downlink configuration. In some embodiments, the predefined table defines the values of k for the different values of n for the TDD uplink/downlink configuration in such a manner that an uplink part of special SFs are treated as uplink sTTIs. In some other embodiments, the predefined table defines the values of k for the different values of n for the TDD uplink/downlink configuration in such a manner that an uplink part of special SFs are not treated as uplink sTTIs. In some embodiments, the predefined table defines the values of k for the different values of $n_{DL}$ in accordance with a latency optimization scheme. In some other embodiments, the predefined table defines the values of k for the different values of $n_{DL}$ in accordance with a load sharing scheme.

In some embodiments, an uplink sTTI can carry downlink HARQ feedback for the downlink transmission received in multiple sTTIs.

In some embodiments, the downlink sTTI $n_{DL}$ and the uplink sTTI $n_{DL}+k$ each have a duration of less than 1 ms. In some other embodiments, the downlink sTTI $n_{DL}$ and the uplink sTTI $n_{DL}+k$ each have a duration of less than 0.5 ms.

Embodiments of a radio access node for a cellular communications network are also disclosed. In some embodiments, a radio access node for a cellular communications network is adapted to transmit a downlink transmission to a wireless device in a downlink sTTI $n_{DL}$, determine, based on a TDD uplink/downlink configuration, a downlink HARQ timing k for reception of downlink HARQ feedback from the wireless device for the downlink transmission transmitted in the downlink sTTI $n_{DL}$, and receive, in an uplink sTTI $n_{DL}+k$, downlink HARQ feedback from the wireless device for the downlink transmission transmitted to the wireless device in the downlink sTTI $n_{DL}$.

In some embodiments, a radio access node for a cellular communications network comprises at least one transceiver, at least one processor, and memory comprising instructions executable by the at least one processor whereby the radio access node is operable to transmit a downlink transmission to a wireless device in a downlink sTTI $n_{DL}$, determine, based on a TDD uplink/downlink configuration, a downlink HARQ timing k for reception of downlink HARQ feedback from the wireless device for the downlink transmission transmitted in the downlink sTTI $n_{DL}$, and receive, in an uplink sTTI $n_{DL}+k$, downlink HARQ feedback from the wireless device for the downlink transmission transmitted to the wireless device in the downlink sTTI $n_{DL}$.

In some embodiments, a radio access node for a cellular communications network comprises a transmitting module, a determining module, and a receiving module. The transmitting module is operable to transmit a downlink transmission to a wireless device in a downlink sTTI $n_{DL}$. The determining module is operable to determine, based on a TDD uplink/downlink configuration, a downlink HARQ timing k for reception of downlink HARQ feedback from the wireless device for the downlink transmission transmitted in the downlink sTTI $n_{DL}$. The receiving module is operable to receive, in an uplink sTTI $n_{DL}+k$, downlink HARQ feedback from the wireless device for the downlink transmission transmitted to the wireless device in the downlink sTTI $n_{DL}$.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 3 and 4 illustrate downlink Hybrid Automatic Repeat Request (HARQ) timing for Timing Division Duplexing (TDD) configuration 0 according to some embodiments of the present disclosure;

DETAILED DESCRIPTION

Figure 1:
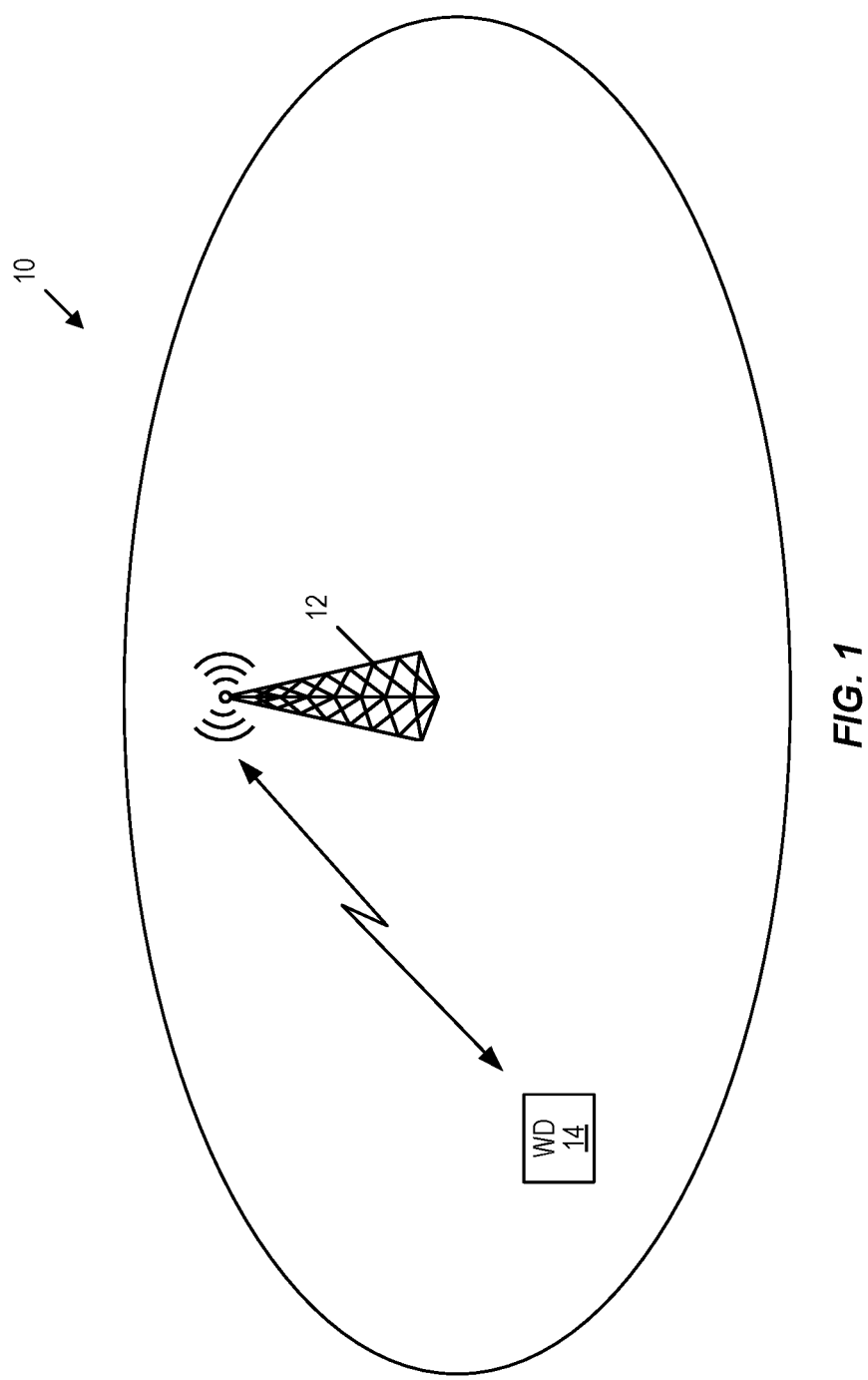
FIG. 1 illustrates one example of a cellular communications network in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the CN of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

In LTE Release 8, a Transmit Time Interval (TTI) corresponds to one Subframe (SF) of length 1 millisecond (ms). One such 1 ms TTI is constructed by using 14 Orthogonal Frequency Division Multiplexing (OFDM) or Single Carrier Frequency Division Multiple Access (SC-FDMA) symbols in the case of normal cyclic prefix and 12 OFDM or SC-FDMA symbols in the case of extended cyclic prefix. In LTE Release 13, a study item was started in 2015 with the goal of specifying transmissions with shorter TTIs that are much shorter than the LTE Release 8 TTI. These shorter TTIs are referred to as short TTIs (sTTIs).

The sTTI can be decided to have any duration in time and comprises resources on a number of OFDM or SC-FDMA symbols within a 1 ms SF. As one example, the duration of the sTTI may be 0.5 ms, i.e. seven OFDM or SC-FDMA symbols for the case with normal cyclic prefix. Another example is a sTTI of only two OFDM or SC-FDMA symbols.

By shortening the TTI length, the minimum processing time required in the terminal and eNB can be reduced. Moreover, by introducing sTTI to the Uplink Part of a Special Subframe (UpPTS) of the existing special SFs, it becomes possible to transmit a short Physical Uplink Shared Channel (sPUSCH) or short Physical Uplink Control Channel (sPUCCH) within the special SFs. This implies that HARQ acknowledgement for downlink transmissions can also be transmitted in UpPTS. Therefore, a new downlink Hybrid Automatic Repeat Request (HARQ) timing table needs to be defined for Time Division Duplexing (TDD) with shortened TTI.

Two different methods, i.e. latency optimized and load balancing, are proposed for the design of a new downlink HARQ timing table for supporting sTTI operations in TDD.

For the latency optimized approach, the HARQ acknowledgement of a downlink transport block in sTTI n is transmitted in sTTI n+k, where k is the smallest value larger than or equal to a predefined minimum timing such that n+k is an uplink sTTI.

For the load balancing approach, the downlink HARQ acknowledgments are equally distributed over different uplink sTTIs.

The proposed solution provides a new downlink HARQ timing table to enable sTTI transmissions in TDD. The latency optimized solution can offer the largest latency reduction gain. On the other hand, the load balancing based solution can simplify the HARQ and control design, with reduced control signaling overhead.

FIG. 1 illustrates one example of a cellular communications network 10 in which embodiments of the present disclosure may be implemented. As illustrated, the cellular communications network 10 includes a radio access node 12 (e.g., a base station or eNB) and a wireless device 14. In the embodiments described herein, the radio access node 12 and the wireless device 14 operate according to a TDD scheme in which some SFs are downlink SFs, some SFs are uplink SFs, and some SFs are special SFs. Embodiments of the present disclosure relate to downlink HARQ timing for sTTI operations in TDD.

Two different methods, i.e. latency optimized and load balancing, are proposed for the design of a new downlink HARQ timing table for supporting sTTI operations in TDD.

It is further understood that the timing designs can be extended to support Carrier Aggregation (CA) with both Frequency Division Duplexing (FDD) and TDD carriers, among different TDD carriers, and also among Frame Structure (FS) type 3 (FS3) carriers and TDD carriers. The timing relations that will be used are formed from the design provided in the present disclosure and extended to the CA design.

In one embodiment, the timing relations are designed based on the latency optimized approach; that is, the HARQ acknowledgement of a downlink transport block in sTTI n is transmitted in sTTI n+k, where k is the smallest value larger than or equal to a predefined minimum timing such that n+k is an uplink sTTI.

In another embodiment, the timing relations are designed based on the load balancing approach; that is, the downlink HARQ acknowledgments are equally distributed over different uplink sTTIs. When designing a load balancing approach, it is possible to consider that not more than four HARQ bits should be sent in a single uplink occasion. The reason for setting it to four is to allow operations of feedback methods that are limited to support maximally four HARQ bits. The HARQ bits may than apply spatial bundling.

In one embodiment, the timing relations for different downlink/uplink configurations are designed based on different approaches; i.e., some downlink/uplink configurations are designed based on the latency optimization approach, while the other downlink/uplink configurations are designed based on the load balancing approach.

In one embodiment, the UpPTS of the special SFs can be used for sending a downlink HARQ acknowledgement, and the downlink HARQ timing for all downlink sTTI transmissions are designed based on either the latency optimized approach or the load balancing approach by treating UpPTS as an uplink sTTI.

In another embodiment, the UpPTS of the special SFs is not used for sending downlink HARQ acknowledgment, and the downlink HARQ timing for all downlink sTTI transmissions are designed based on either the latency optimized approach or the load balancing approach by not treating UpPTS as an uplink sTTI.

In another embodiment, the UpPTS of the special SFs only contains sPUSCH and no sPUCCH, and the radio access node 12 (e.g., eNB) makes use of scheduling to receive downlink HARQ feedback in UpPTS. In this embodiment, the wireless device 14 (e.g., UE) checks the scheduled sPUSCH transmission in the future to identify whether to send the HARQ feedback in UpPTS or in a later uplink sTTI.

Figure 2:
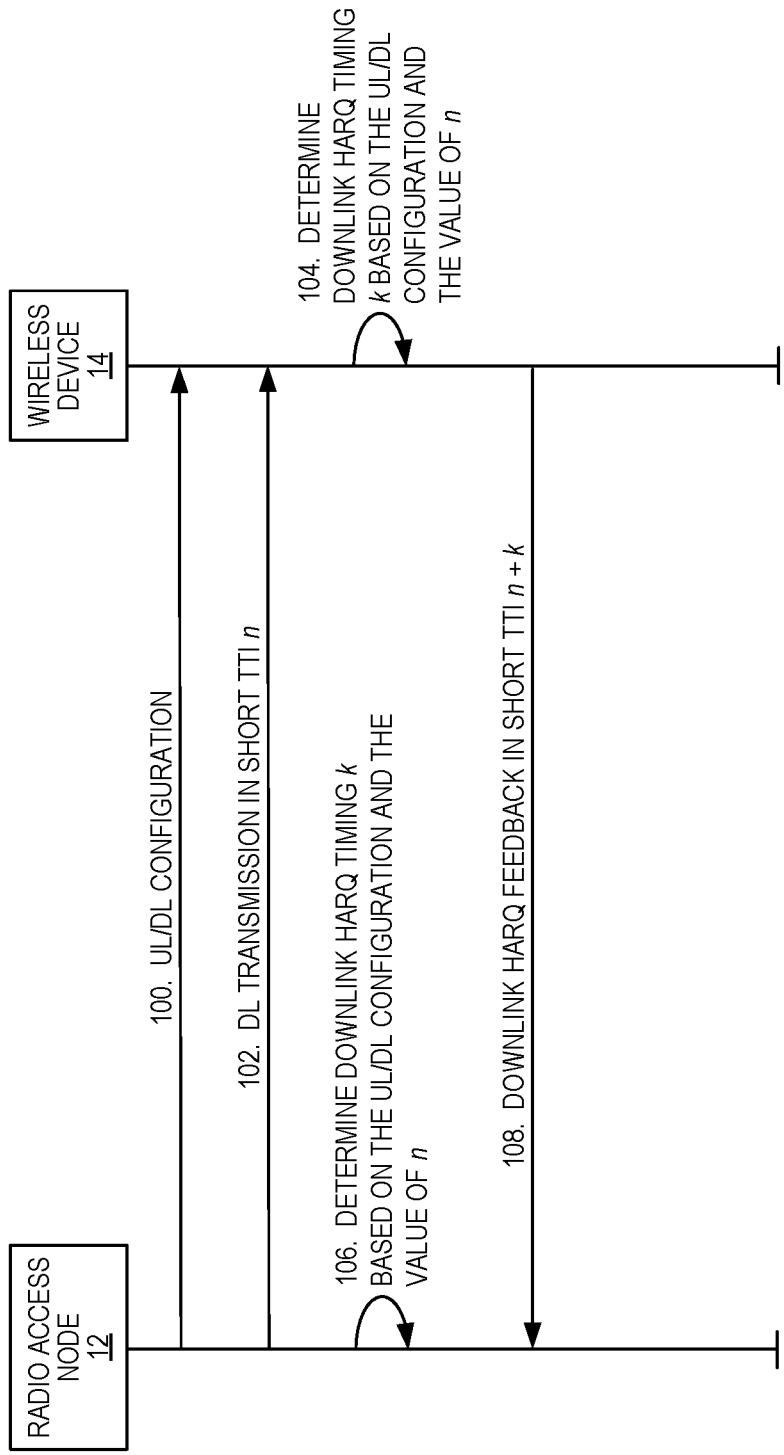
FIG. 2 illustrates the operation of the radio access node and the wireless device of FIG. 1 according to some embodiments of the present disclosure.

In this regard, FIG. 2 illustrates the operation of the radio access node 12 and the wireless device 14 according to some embodiments of the present disclosure. As illustrated, the radio access node 12 transmits (e.g., broadcasts) an uplink/downlink (UL/DL) configuration (step 100). At some point, the radio access node 12 transmits a downlink transmission to the wireless device 14 in sTTI n (step 102). In other words, the radio access node 12 transmits a downlink transmission to the wireless device 14 in a sTTI having a sTTI index n, which is more specifically referred to herein as a sTTI index $n_{DL}$. As such, the sTTI index of the sTTI in which the downlink transmission is transmitted is hereinafter referred to as $n_{DL}$. The wireless device 14 determines a downlink HARQ timing k for transmitting downlink HARQ feedback to the radio access node 12 based on the UL/DL configuration (step 104). As discussed herein, in some embodiments, the wireless device 14 determines the downlink HARQ timing k based on predefined tables (e.g., tables specified in a standard). As an example, the downlink HARQ timing k may be determined using the tables defined below. For the latency optimized approach, the downlink HARQ timing k is the smallest value larger than or equal to a predefined minimum timing such that $n_{DL}$+k is an uplink sTTI. Note that, as denoted herein, $n_{UL}=n_{DL}$+k or equivalently $n_{DL}=n_{UL}$−k, where $n_{UL}$ is a sTTI index for the sTTI in which the wireless device 14 is to transmit, and the radio access node 12 is to receive, downlink HARQ feedback. Further, in some embodiments, the HARQ timing k is determined (e.g., the predefined tables are defined) such that the UpPTS of the special SFs are used for downlink HARQ feedback (i.e., the UpPTS of the special SFs is treated as uplink sTTIs). In other embodiments, the HARQ timing k is determined (e.g., the predefined tables are defined) such that the UpPTS of the special SFs are not used for downlink HARQ feedback (i.e., the UpPTS of the special SFs are not treated as uplink sTTIs). Still further, as described herein, in some embodiments, the downlink HARQ timing k is determined based on a latency optimization approach, whereas, in other embodiments, the downlink HARQ timing k is determined based on a load balancing approach.

In a similar manner, the radio access node 12 also determines the downlink HARQ timing k such that the radio access node 12 knows when to expect downlink HARQ feedback from the wireless device 14 (step 106). The wireless device 14 transmits, and the radio access node 12 receives, downlink HARQ feedback in sTTI $n_{DL}$+k for the downlink transmission in step 102 (step 108). In other words, the wireless device 14 transmits, and the radio access node 12 receives, downlink HARQ feedback in a sTTI having a sTTI index $n_{DL}$+k. Note that this sTTI in which the wireless device 14 transmits the downlink HARQ feedback is also referred to herein as a sTTI having sTTI index $n_{UL}$, where $n_{UL}=n_{DL}$+k.

In the following, some examples on how to form the downlink HARQ timing table for seven-symbol TTI, i.e., slot-based TTI, in TDD are given. In other words, in the following examples, the sTTI has a length of seven symbols, which is one slot. Note that the same methodology applies for other lengths of sTTI.

Here, the minimum timing for downlink HARQ feedback is assumed to be four times of the sTTI length.

For TDD downlink/uplink configuration 0, the downlink HARQ timing is the same for the latency optimized approach and the load balancing approach, as shown in FIG. 3 and FIG. 4. In FIG. 3, UpPTS is not used for sending downlink HARQ feedback. In FIG. 4, UpPTS is used for sending downlink HARQ feedback. It can also be observed that the downlink HARQ timing is independent of the usage of UpPTS for downlink HARQ feedback.

Figure 5:
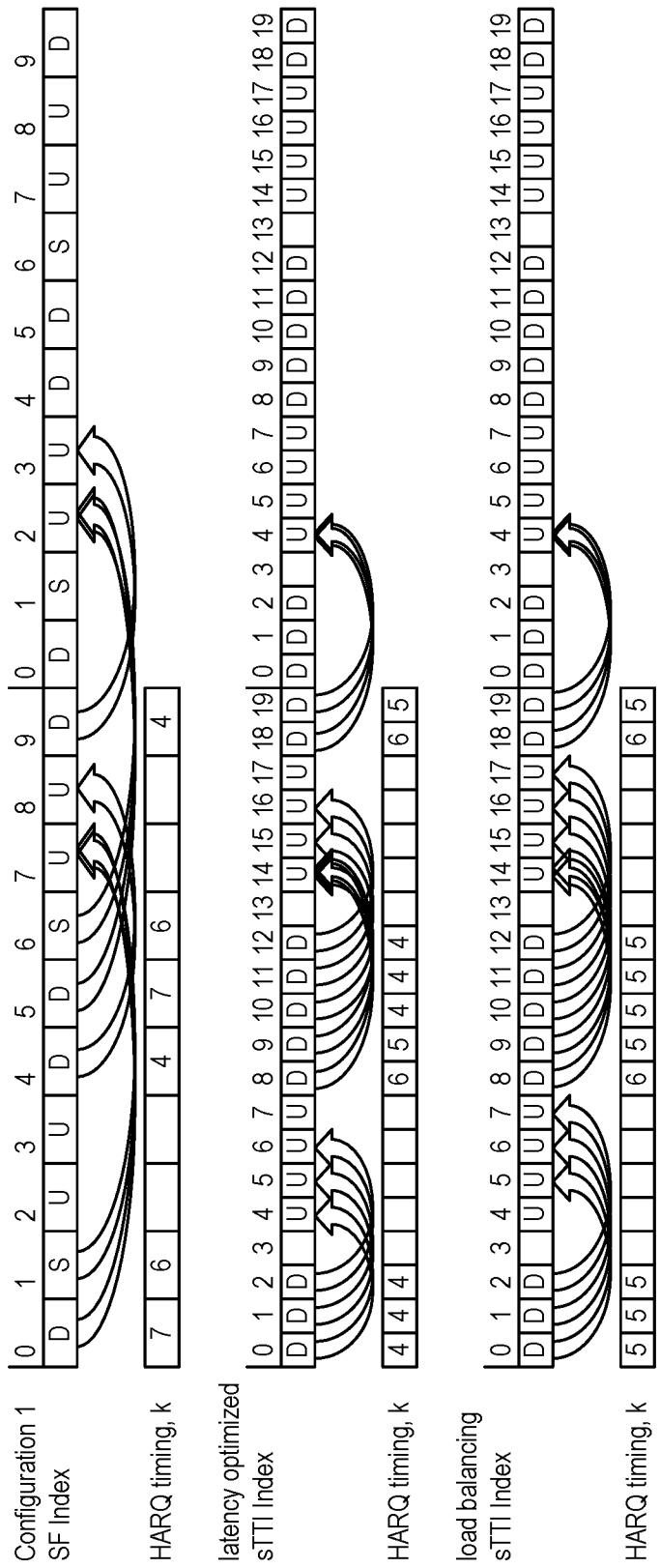
FIGS. 5 and 6 illustrate downlink HARQ timing for TDD configuration 1 according to some embodiments of the present disclosure.
Figure 6:
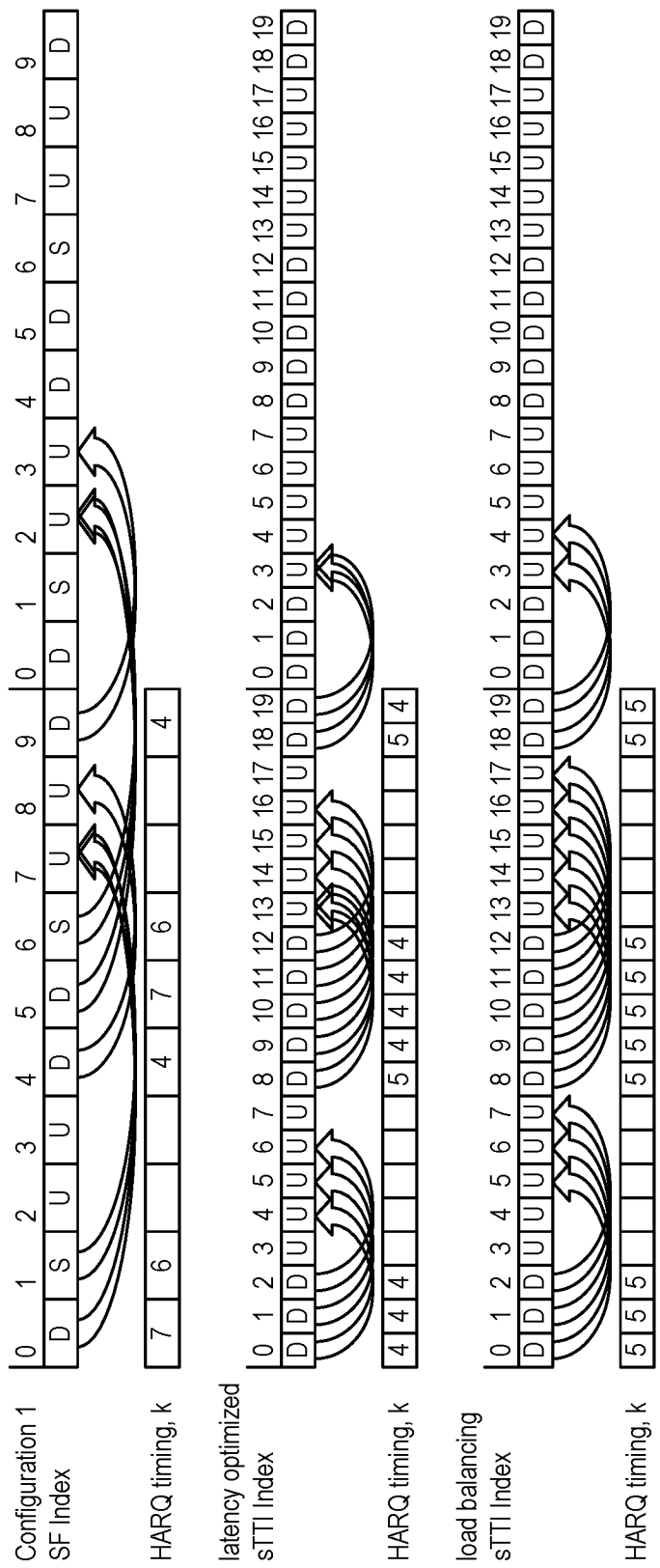

FIG. 5 and FIG. 6 show the downlink HARQ timing for TDD downlink/uplink configuration 1 for the cases of without and with HARQ feedback on UpPTS, respectively.

Figure 7:
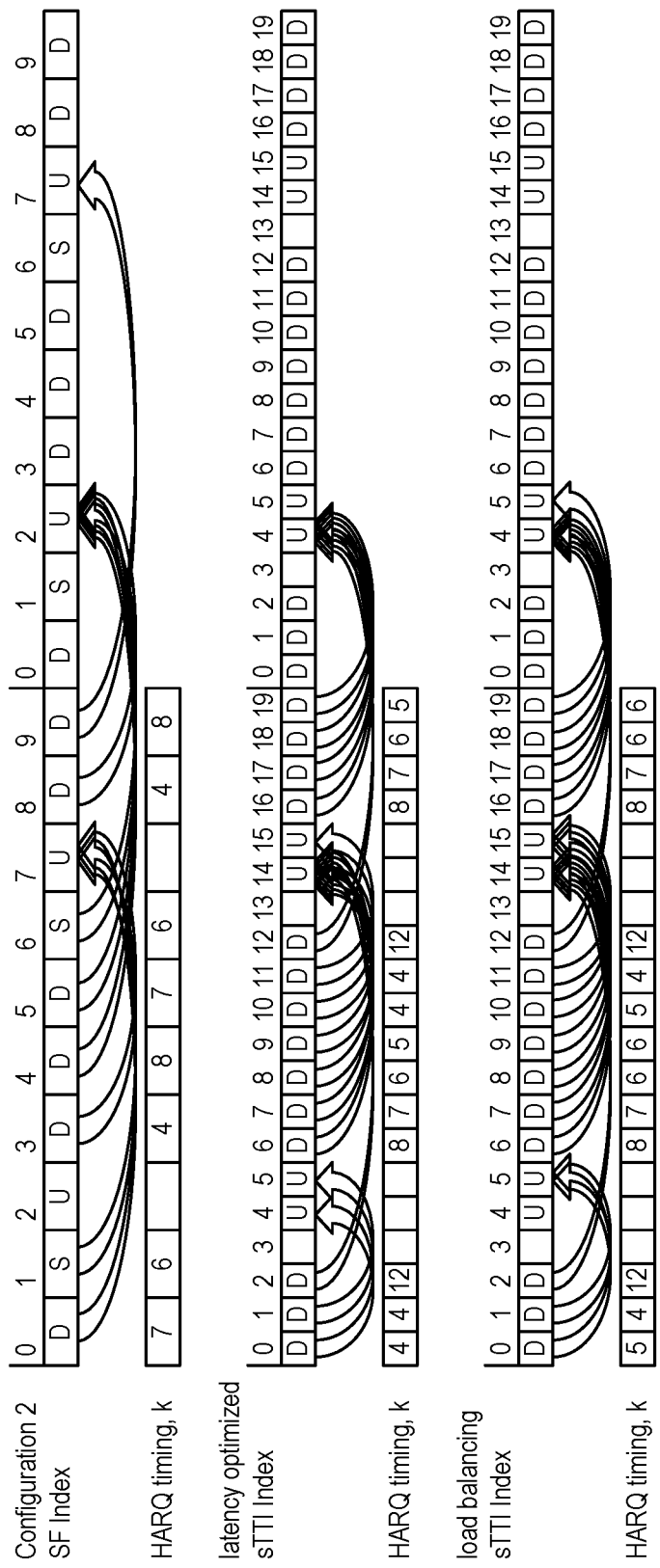
FIGS. 7 and 8 illustrate downlink HARQ timing for TDD configuration 2 according to some embodiments of the present disclosure.
Figure 8:
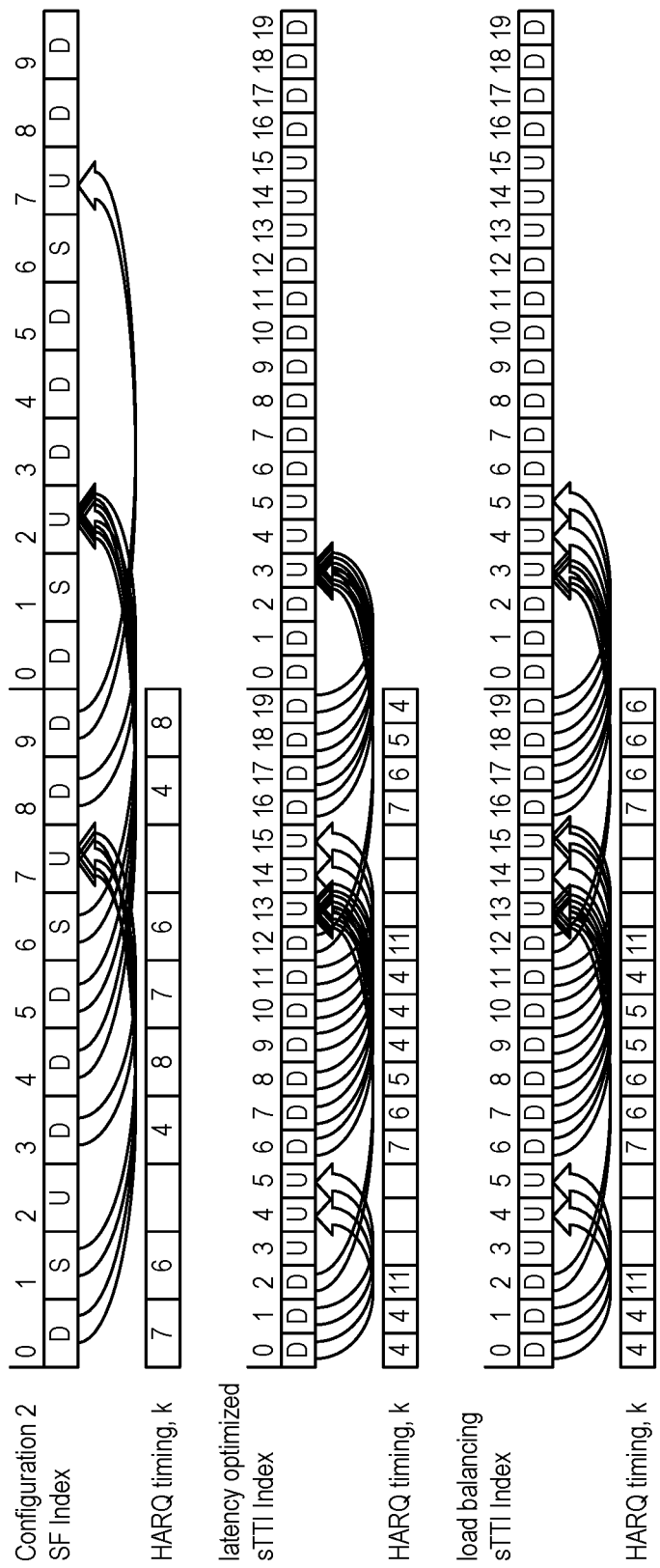

FIG. 7 and FIG. 8 show the downlink HARQ timing for TDD downlink/uplink configuration 2 for the cases of without and with HARQ feedback on UpPTS, respectively.

Figure 9:
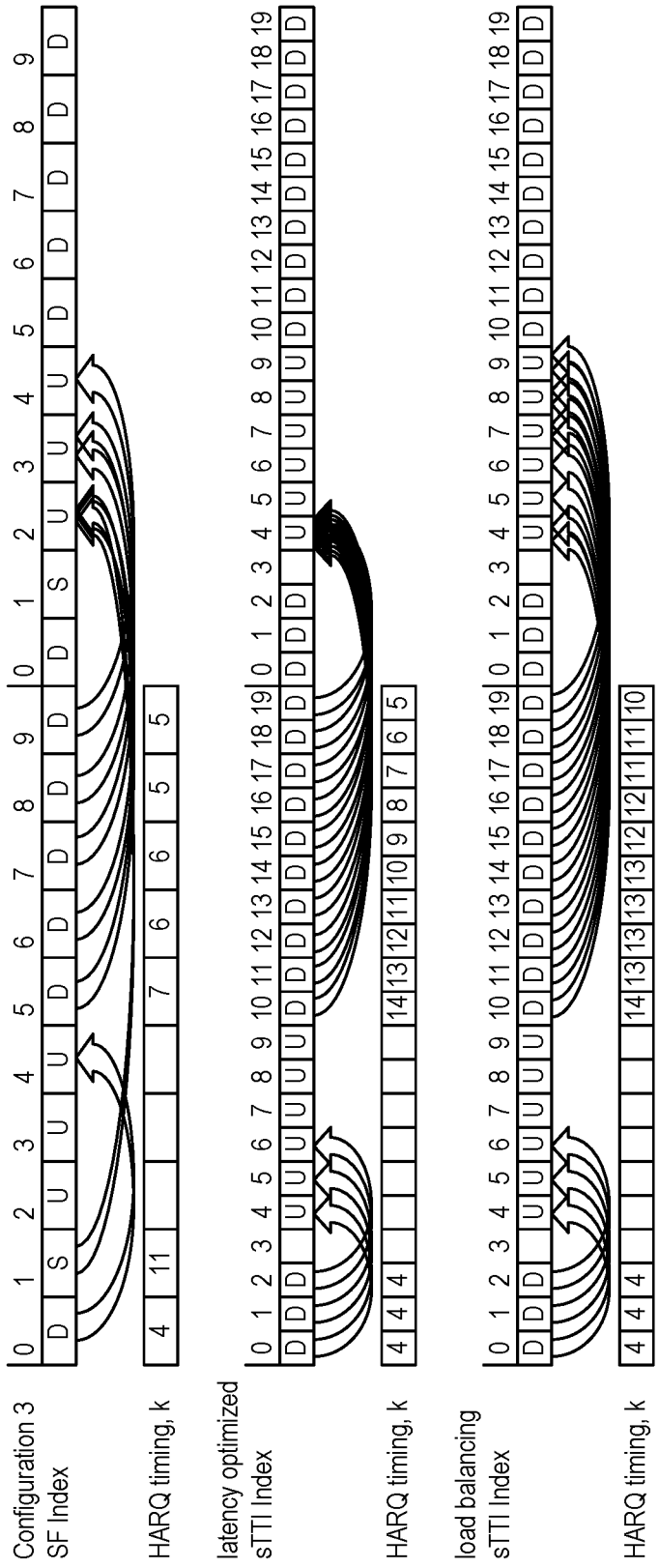
FIGS. 9 and 10 illustrate downlink HARQ timing for TDD configuration 3 according to some embodiments of the present disclosure.
Figure 10:
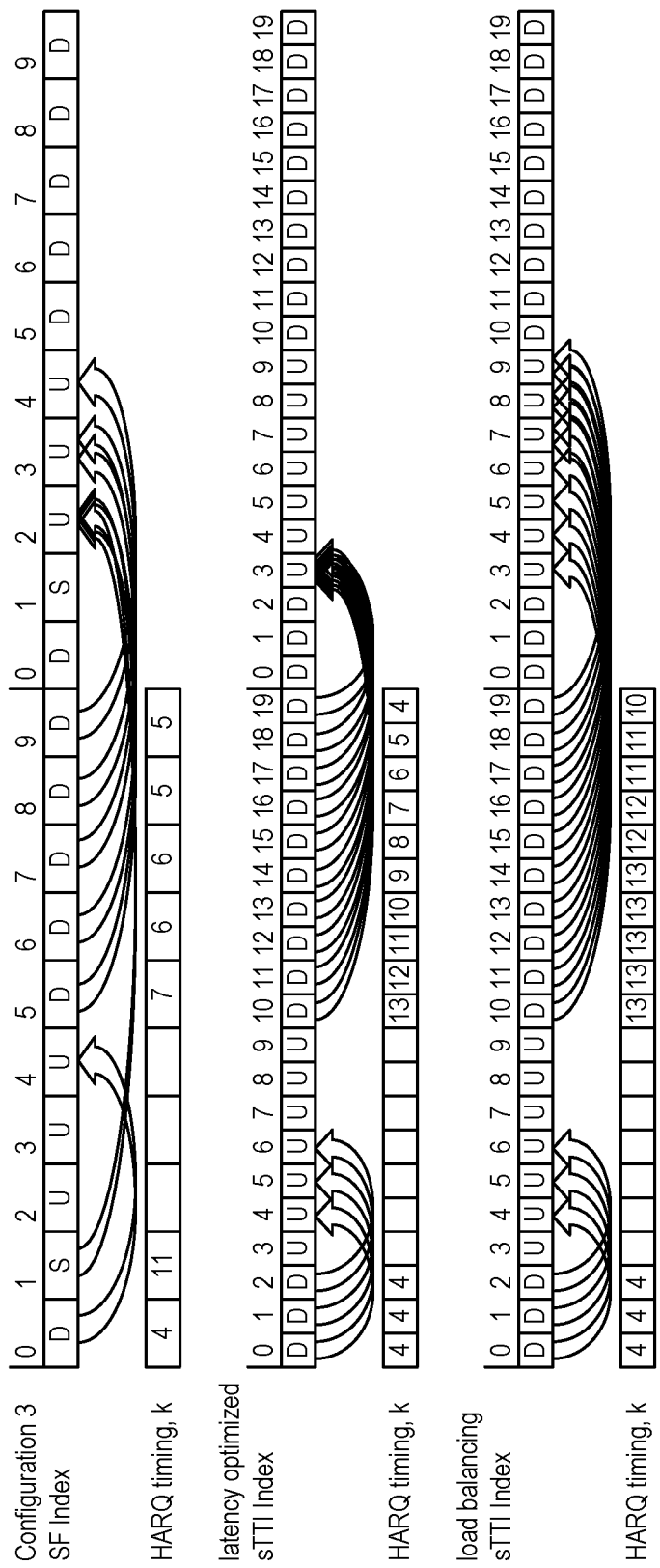

FIG. 9 and FIG. 10 show the downlink HARQ timing for TDD downlink/uplink configuration 3 for the cases of without and with HARQ feedback on UpPTS, respectively.

Figure 11:
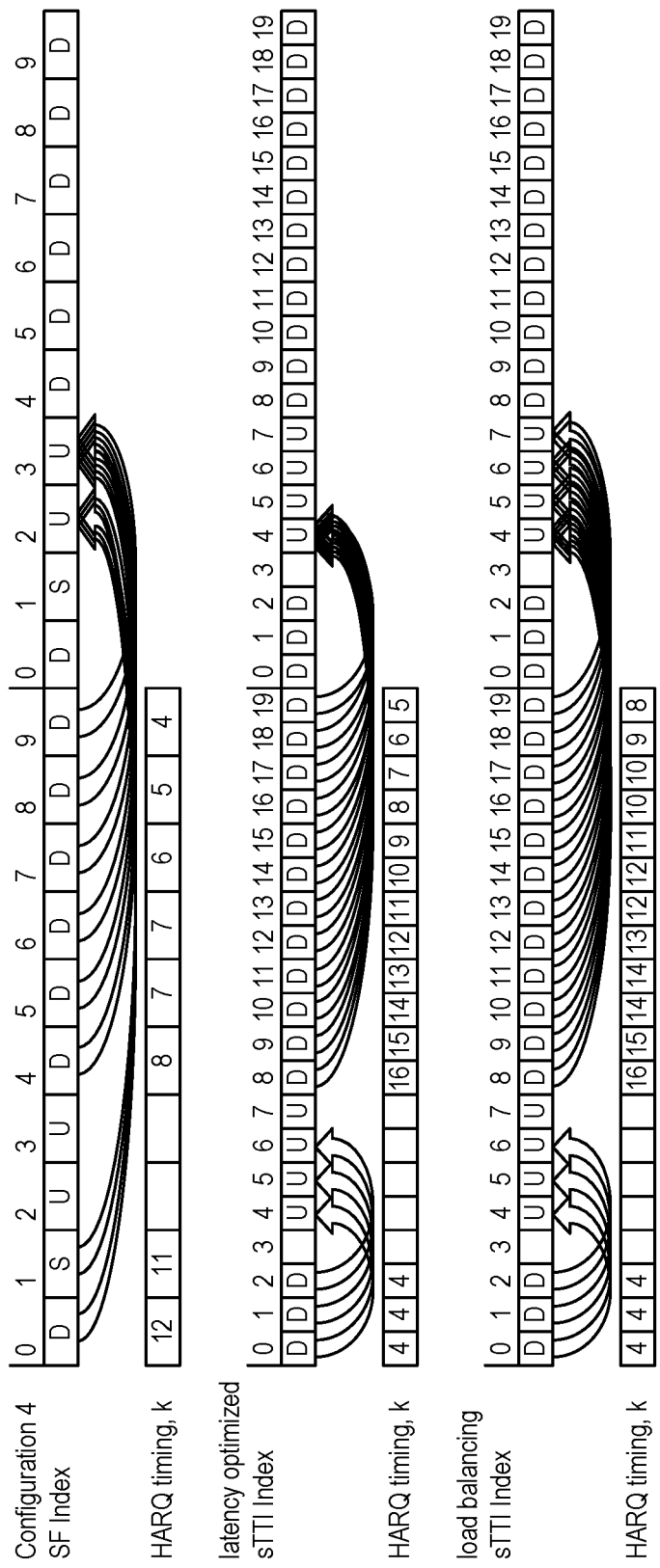
FIGS. 11 and 12 illustrate downlink HARQ timing for TDD configuration 4 according to some embodiments of the present disclosure.
Figure 12:
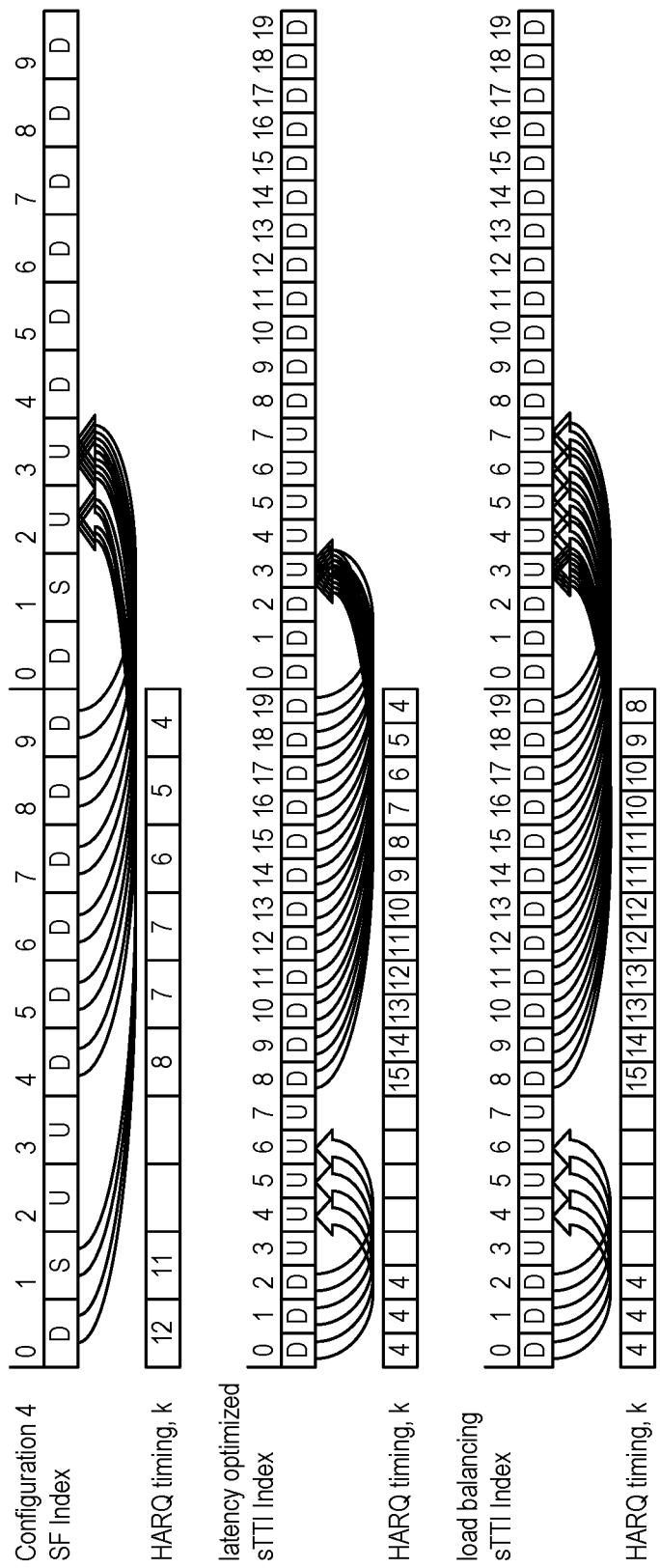

FIG. 11 and FIG. 12 show the downlink HARQ timing for TDD downlink/uplink configuration 4 for the cases of without and with HARQ feedback on UpPTS, respectively.

Figure 13:
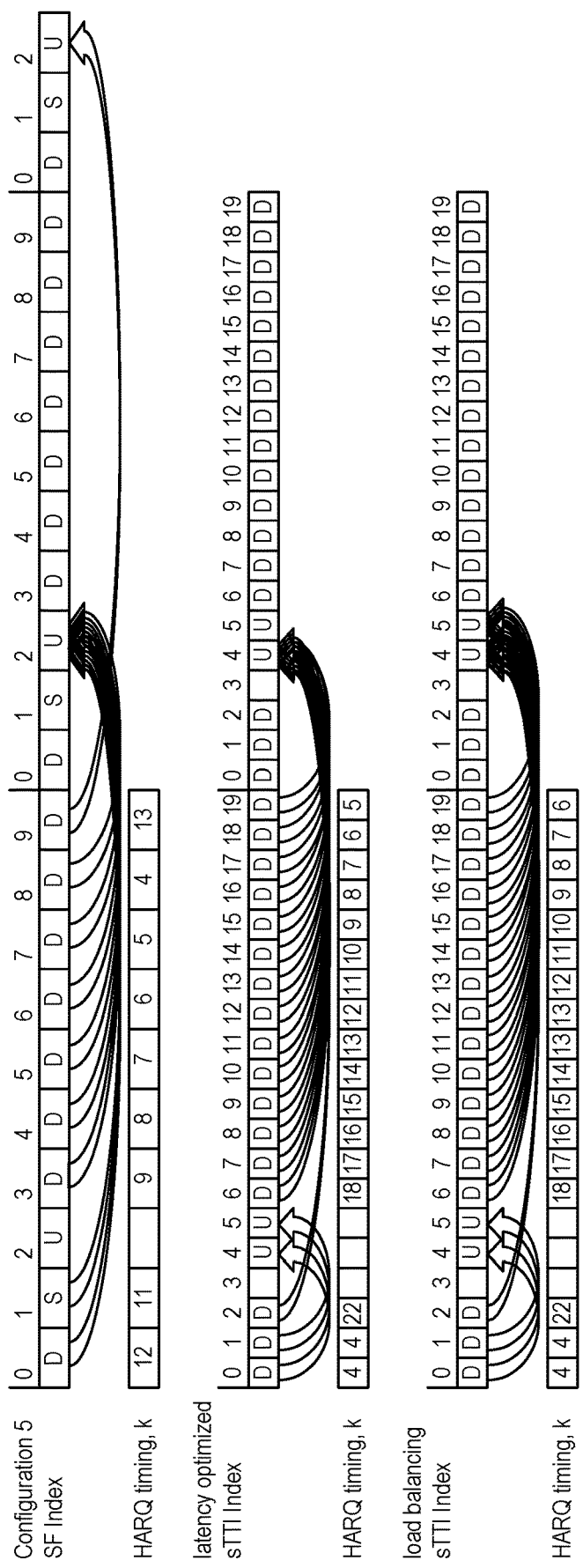
FIGS. 13 and 14 illustrate downlink HARQ timing for TDD configuration 5 according to some embodiments of the present disclosure.
Figure 14:
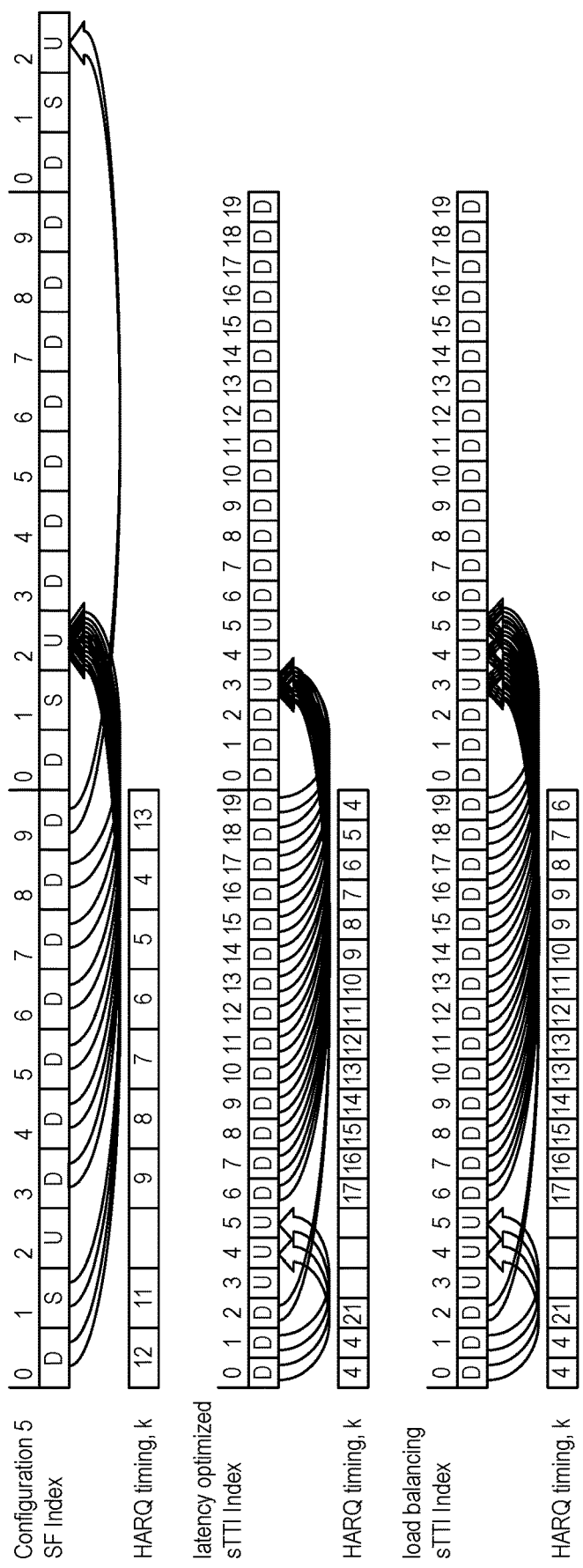

FIG. 13 and FIG. 14 show the downlink HARQ timing for TDD downlink/uplink configuration 5 for the cases of without and with HARQ feedback on UpPTS, respectively.

Figure 15:
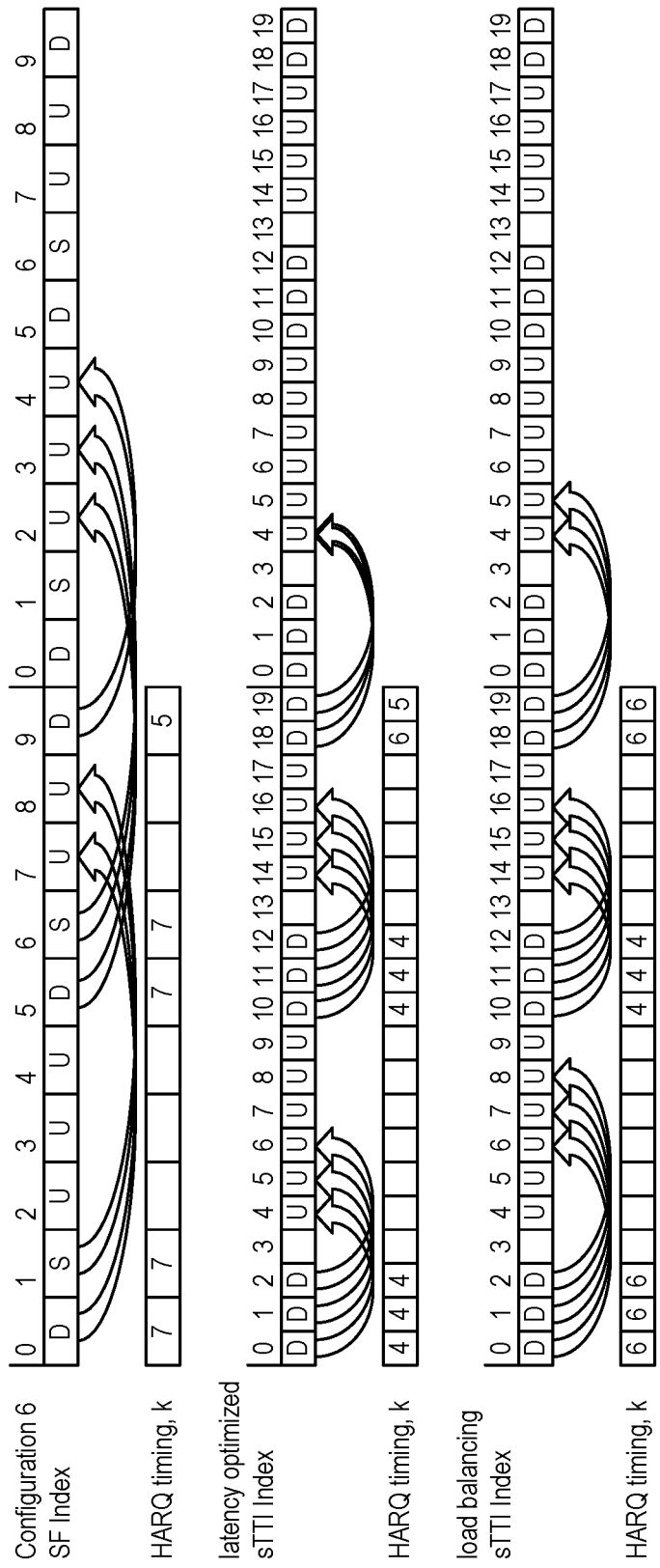
FIGS. 15 and 16 illustrate downlink HARQ timing for TDD configuration 6 according to some embodiments of the present disclosure.
Figure 16:
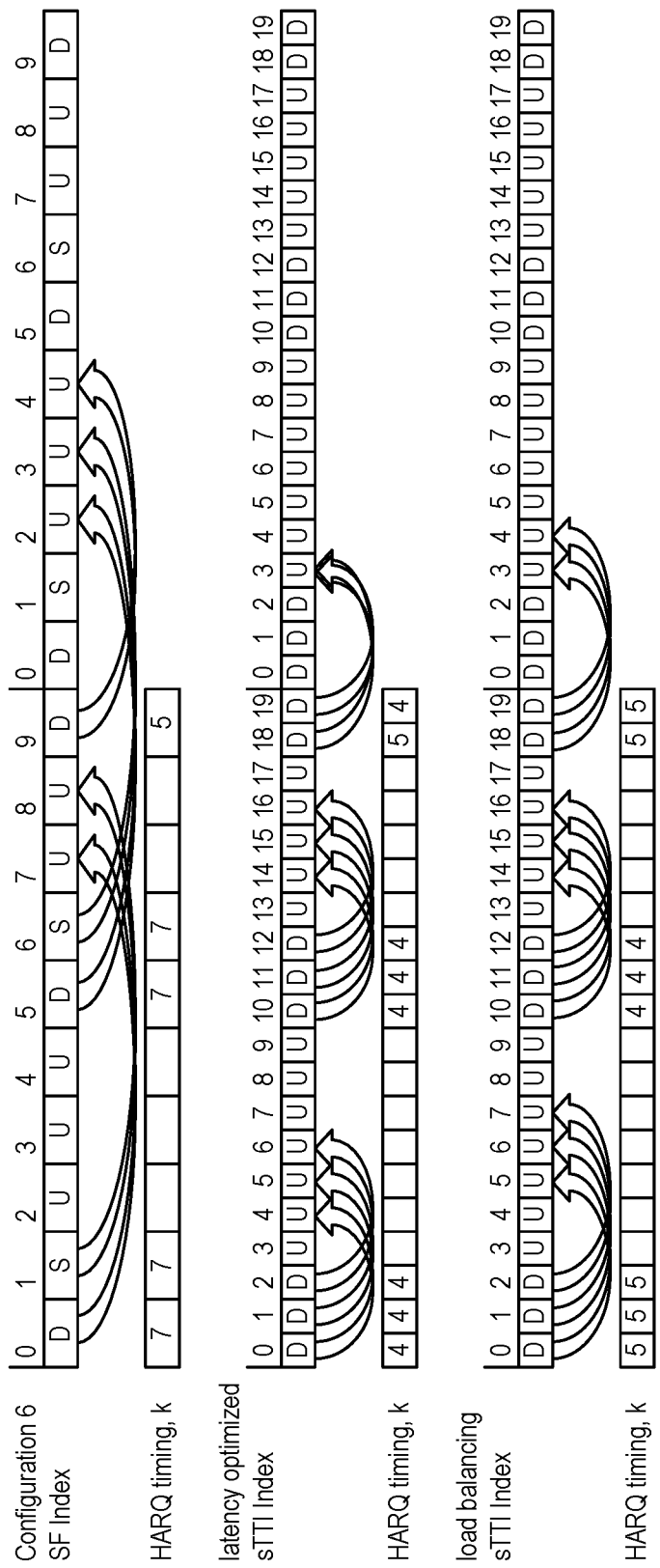

FIG. 15 and FIG. 16 show the downlink HARQ timing for TDD downlink/uplink configuration 6 for the cases of without and with HARQ feedback on UpPTS, respectively.

In the following description, the downlink HARQ timing for different downlink/uplink configurations is summarized into tables. Note that, for all examples shown in this section, the minimum timing for downlink HARQ feedback is assumed to be four times of the sTTI length. The tables will look different when the minimum timing is different. However, the same methodology can be used to update the tables.

The tables are obtained by using the same design approach, i.e., either latency optimized or load balancing based, for all downlink/uplink configurations. If different approaches are used for different downlink/uplink configurations, a new table can be created by selecting different rows from the corresponding tables.

Assuming that UpPTS is not used for sending downlink HARQ feedback, Table 4 and Table 5 summarize the downlink HARQ timing tables for all TDD downlink/uplink configurations with slot-based TTI by using the latency optimized approach and the load balancing approach, respectively. Table 6 and Table 7 give the corresponding downlink association tables based on the downlink HARQ timing from Table 4 and Table 5, respectively. The number of elements in a set K corresponds to the number of downlink transmissions that should be acknowledged within the uplink sTTI. So, an uplink slot-based TTI $n_{UL}$ should contain the HARQ feedback for the downlink slot-based TTIs sent in $n_{DL}=n_{UL}-k$, where k belongs to the set K given by the downlink association tables (Table 6 and Table 7).

TABLE 4

Downlink HARQ Timing k for TDD with Slot-Based TTI (Latency Optimized, UpPTS Not Used for HARQ Feedback)

| TDD DL/UL Configuration | Slot (TTI) Index n (i.e., downlink sTTI $n_{DL}$) | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 0 | 4 | 4 | 4 | | | | | | | | 4 | 4 | 4 | | | | | | | |
| 1 | 4 | 4 | 4 | | | | | | 6 | 5 | 4 | 4 | 4 | | | | | | 6 | 5 |
| 2 | 4 | 4 | 12 | | | | 8 | 7 | 6 | 5 | 4 | 4 | 12 | | | | 8 | 7 | 6 | 5 |
| 3 | 4 | 4 | 4 | | | | | | | | 14 | 13 | 12 | 11 | 10 | 9 | 8 | 7 | 6 | 5 |
| 4 | 4 | 4 | 4 | | | | | | 16 | 15 | 14 | 13 | 12 | 11 | 10 | 9 | 8 | 7 | 6 | 5 |
| 5 | 4 | 4 | 22 | | 18 | 17 | 16 | 15 | 14 | 13 | 12 | 11 | 10 | 9 | 8 | 7 | 6 | 5 | | |
| 6 | 4 | 4 | 4 | | | | | | | | 4 | 4 | 4 | | | | | | 6 | 5 |

TABLE 5

Downlink HARQ Timing k for TDD with Slot-Based TTI (Load Balancing, UpPTS Not Used for HARQ Feedback)

| TDD DL/UL Configuration | Slot Index n (i.e., downlink sTTI $n_{DL}$) | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 0 | 4 | 4 | 4 | | | | | | | | 4 | 4 | 4 | | | | | | | |
| 1 | 5 | 5 | 5 | | | | | | 6 | 5 | 5 | 5 | 5 | | | | | | 6 | 5 |
| 2 | 4 | 4 | 12 | | | | 8 | 7 | 6 | 6 | 5 | 4 | 12 | | | | 8 | 7 | 7 | 6 |
| 3 | 4 | 4 | 4 | | | | | | | | 14 | 13 | 13 | 13 | 13 | 12 | 12 | 11 | 11 | 10 |
| 4 | 4 | 4 | 4 | | | | | | 16 | 15 | 14 | 14 | 13 | 12 | 12 | 11 | 10 | 10 | 9 | 8 |
| 5 | 4 | 4 | 22 | | 18 | 17 | 16 | 15 | 14 | 13 | 13 | 12 | 11 | 10 | 9 | 8 | 7 | 6 | | |
| 6 | 6 | 6 | 6 | | | | | | | | 4 | 4 | 4 | | | | | | 6 | 6 |

TABLE 6

Downlink Association Set Index K: $\{k_0, k_1, \ldots k_{M-1}\}$ for TDD with Slot-Based TTI (Latency Optimized, UpPTS Not Used for HARQ Feedback)

| TDD DL/UL Configuration | Slot (TTI) Index n (i.e., uplink sTTI $n_{UL}$) | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 0 | | | | | 4 | 4 | 4 | | | | | | | | 4 | 4 | 4 | | | |
| 1 | | | | | 4, 5, 6 | 4 | 4 | | | | | | | | 4, 5, 6 | 4 | 4 | | | |
| 2 | | | | | 4, 5, 6, 7, 8, 12 | 4 | | | | | | | | | 4, 5, 6, 7, 8, 12 | 4 | | | | |
| 3 | | | | | 4, 5, 6, 7, 8, 9, 10, 11, 12, 13, 14 | 4 | 4 | | | | | | | | | | | | | |
| 4 | | | | | 4, 5, 6, 7, 8, 9, 10, 11, 12, 13, 14, 15, 16 | 4 | 4 | | | | | | | | | | | | | |
| 5 | | | | | 4, 5, 6, 7, 8, 9, 10, 11, 12, 13, 14, 15, 16, 17, 18, 22 | 4 | | | | | | | | | | | | | | |
| 6 | | | | | 4, 5, 6 | 4 | 4 | | | | | | | | 4 | 4 | 4 | | | |

TABLE 7

Downlink Association Set Index K: {k₀, k₁, ... k_{M-1}} for TDD with Slot-Based TTI (Load Balancing, UpPTS Not Used for HARQ Feedback)

| TDD DL/UL Configuration | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | 4 | 4 | 4 | | | | | | | | 4 | 4 | 4 | | | |
| 1 | | | | | 5, 6 | 5 | 5 | 5 | | | | | | | 5, 6 | 5 | 5 | 5 | | |
| 2 | | | | | 6, 7, 8 | 4, 5, 6, 12 | | | | | | | | | 6, 7, 8 | 4, 5, 6, 12 | | | | |
| 3 | | | | | 4, 13, 14 | 4, 13 | 4, 13 | 12, 13 | 11, 12 | 10, 11 | | | | | | | | | | |
| 4 | | | | | 4, 14, 15, 16 | 4, 12, 13 | 4, 10, 11, 12 | 8, 9, 10 | | | | | | | | | | | | |
| 5 | | | | | 4, 13, 14, 15, 16, 17, 18, 22 | 4, 6, 7, 8, 9, 10, 11, 12, 13 | | | | | | | | | | | | | | |
| 6 | | | | | 6 | 6 | 6 | 6 | 6 | | | | | | 4 | 4 | 4 | | | |

Assuming that UpPTS is used for sending downlink HARQ feedback, Table 8 and Table 9 summarize the downlink HARQ timing tables for all TDD downlink/uplink configurations with slot-based TTI by using the latency optimized approach and the load balancing approach, respectively. Table 10 and Table 11 give the corresponding downlink association tables based on the downlink HARQ timing from Table 8 and Table 9, respectively. The number of elements in a set k corresponds to the number of downlink transmissions that should be acknowledged within the uplink sTTI.

TABLE 8

Downlink HARQ Timing k for TDD with Slot-Based TTI
(Latency Optimized, UpPTS Used for HARQ Feedback)

| TDD DL/UL Configuration | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | 4 | 4 | 4 | | | | | | | 4 | 4 | 4 | | | | | | | |
| 1 | | 4 | 4 | 4 | | | | | 5 | 4 | 4 | 4 | 4 | | | | | | 5 | 4 |
| 2 | | 4 | 4 | 11 | | | 7 | 6 | 5 | 4 | 4 | 4 | 11 | | | | 7 | 6 | 5 | 4 |
| 3 | | 4 | 4 | 4 | | | | | | | 13 | 12 | 11 | 10 | 9 | 8 | 7 | 6 | 5 | 4 |
| 4 | | 4 | 4 | 4 | | | | | 15 | 14 | 13 | 12 | 11 | 10 | 9 | 8 | 7 | 6 | 5 | 4 |
| 5 | | 4 | 4 | 21 | | | 17 | 16 | 15 | 14 | 13 | 12 | 11 | 10 | 9 | 8 | 7 | 6 | 5 | 4 |
| 6 | | 4 | 4 | 4 | | | | | | | 4 | 4 | 4 | | | | | | 5 | 4 |

TABLE 9

Downlink HARQ Timing k for TDD with Slot-Based TTI
(Load Balancing, UpPTS Used for HARQ Feedback)

| TDD DL/UL Configuration | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | 4 | 4 | 4 | | | | | | | 4 | 4 | 4 | | | | | | | |
| 1 | | 5 | 5 | 5 | | | | | 5 | 5 | 5 | 5 | 5 | | | | | | 5 | 5 |
| 2 | | 4 | 4 | 11 | | | 7 | 6 | 6 | 5 | 5 | 4 | 11 | | | | 7 | 6 | 6 | 6 |
| 3 | | 4 | 4 | 4 | | | | | | | 13 | 13 | 13 | 13 | 13 | 12 | 12 | 11 | 11 | 10 |
| 4 | | 4 | 4 | 4 | | | | | 15 | 14 | 13 | 13 | 12 | 12 | 11 | 11 | 10 | 10 | 9 | 8 |
| 5 | | 4 | 4 | 21 | | | 17 | 16 | 15 | 14 | 13 | 13 | 12 | 11 | 10 | 9 | 9 | 8 | 7 | 6 |
| 6 | | 5 | 5 | 5 | | | | | | | 4 | 4 | 4 | | | | | | 5 | 5 |

TABLE 10

Downlink Association Set Index K: {k₀, k₁, ... k_{M-1}} for TDD with Slot-Based TTI (Latency Optimized, UpPTS Used for HARQ Feedback)

| TDD DL/UL Configuration | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | 4 | 4 | 4 | | | | | | | | 4 | 4 | 4 | | | |
| 1 | | | | 4, 5 | 4 | 4 | 4 | | | | | | | 4, 5 | 4 | 4 | 4 | | | |
| 2 | | | | 4, 5, 6, 7, 11 | 4 | 4 | | | | | | | | 4, 5, 6, 7, 11 | 4 | 4 | | | | |
| 3 | | | | 4, 5, 6, 7, 8, 9, 10, 11, 12, 13 | 4 | 4 | 4 | | | | | | | | | | | | | |
| 4 | | | | 4, 5, 6, 7, 8, 9, 10, 11, 12, 13, 14, 15 | 4 | 4 | 4 | | | | | | | | | | | | | |
| 5 | | | | 4, 5, 6, 7, 8, 9, 10, 11, 12, 13, 14, 15, 16, 17, 21 | 4 | 4 | | | | | | | | | | | | | | |
| 6 | | | | 4, 5 | 4 | 4 | 4 | | | | | | | | 4 | 4 | 4 | | | |

TABLE 11

Downlink Association Set Index K: {k₀, k₁, ... k_{M-1}} for TDD with Slot-Based TTI (Load Balancing, UpPTS Used for HARQ Feedback)

| TDD DL/UL Configuration | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | 4 | 4 | 4 | | | | | | | | 4 | 4 | 4 | | | |
| 1 | | | | 5 | 5 | 5 | 5 | 5 | | | | | | 5 | 5 | 5 | 5 | 5 | | |
| 2 | | | | 6, 7, 11 | 4, 6 | 4, 6 | | | | | | | | 6, 7, 11 | 4, 6 | 4, 6 | | | | |
| 3 | | | | 13 | 4, 1 3 | 4, 13 | 4, 13 | 12, 13 | 11, 12 | 10, 11 | | | | | | | | | | |
| 4 | | | | 13, 14, 15 | 4, 12, 13 | 4, 11, 12 | 4, 10, 11 | 8, 9, 10 | | | | | | | | | | | | |
| 5 | | | | 13, 14, 15, 16, 17, 21 | 4, 9, 10, 11, 12, 13 | 4, 6, 7, 8, 9 | | | | | | | | | | | | | | |
| 6 | | | | 5 | 5 | 5 | 5 | | | | | | | | 4 | 4 | 4 | | | |

The enhancement of UpPTS may only contain the transmission of sPUSCH (data transmission) and no sPUCCH (no control information). In that case, to achieve lower delay to get the downlink HARQ feedback, the eNB schedules a sPUSCH transmission in UpPTS when expecting that the HARQ feedback would be ready earlier. Take the example of TDD uplink/downlink configuration 1 in FIG. 5 and FIG. 6. The HARQ feedback for sTTIs 8 and 9 are sent earlier in case UpPTS is used for HARQ feedback than otherwise. So, it would be beneficial for the eNB to make use of UpPTS for HARQ feedback transmission over sPUSCH if UpPTS does not contain sPUCCH.

Figure 17:
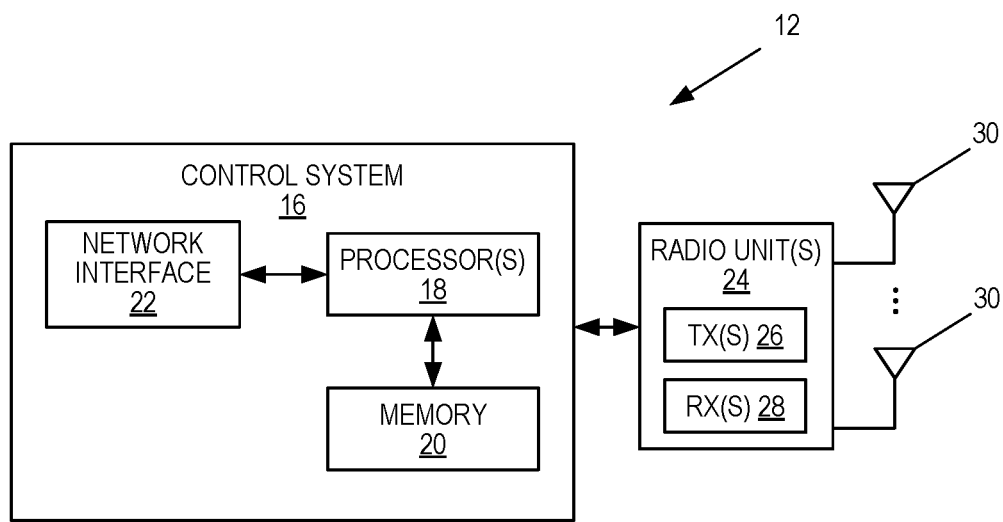
FIGS. 17 through 19 illustrate embodiments of a radio access node.

FIG. 17 is a schematic block diagram of the radio access node 12 according to some embodiments of the present disclosure. As illustrated, the radio access node 12 includes a control system 16 that includes one or more processors 18 (e.g., Central Processing Units (CPUs), Application Specific Integrated Circuits (ASICs), Field Programmable Gate Arrays (FPGAs), and/or the like), memory 20, and a network interface 22. In addition, the radio access node 12 includes one or more radio units 24 that each includes one or more transmitters 26 and one or more receivers 28 coupled to one or more antennas 30. In some embodiments, the radio unit(s) 24 is external to the control system 16 and connected to the control system 16 via, e.g., a wired connection (e.g., an optical cable). However, in some other embodiments, the radio unit(s) 24 and potentially the antenna(s) 30 are integrated together with the control system 16. The one or more processors 18 operate to provide one or more functions of a radio access node 12 as described herein. In some embodiments, the function(s) are implemented in software that is stored, e.g., in the memory 20 and executed by the one or more processors 18.

Figure 18:
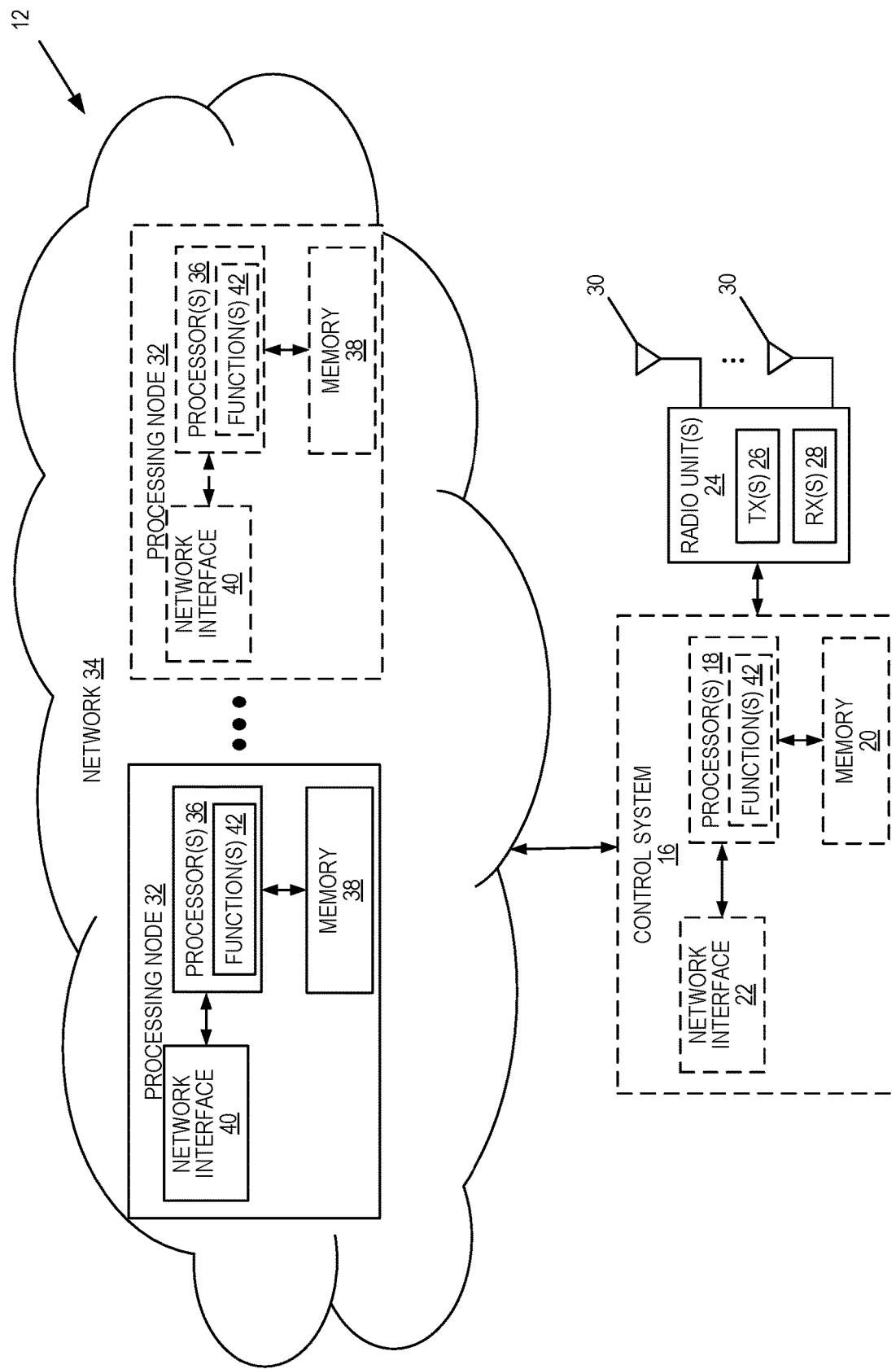

FIG. 18 is a schematic block diagram that illustrates a virtualized embodiment of the radio access node 12 according to some embodiments of the present disclosure. This discussion is equally applicable to other types of network nodes. Further, other types of network nodes may have similar virtualized architectures.

As used herein, a "virtualized" radio access node 12 is an implementation of the radio access node 12 in which at least a portion of the functionality of the radio access node 12 is implemented as a virtual component(s) (e.g., via a virtual machine(s) executing on a physical processing node(s) in a network(s)). As illustrated, in this example, the radio access node 12 includes the control system 16 (optional) that includes the one or more processors 18 (e.g., CPUs, ASICs, FPGAs, and/or the like), the memory 20, and the network interface 22 and the one or more radio units 24 that each includes the one or more transmitters 26 and the one or more receivers 28 coupled to the one or more antennas 30, as described above. The control system 16 is connected to the radio unit(s) 24 via, for example, an optical cable or the like. The control system 16 is connected to one or more processing nodes 32 coupled to or included as part of a network(s) 34 via the network interface 22. Each processing node 32 includes one or more processors 36 (e.g., CPUs, ASICs, FPGAs, and/or the like), memory 38, and a network interface 40.

In this example, functions 42 of the radio access node 12 described herein are implemented at the one or more processing nodes 32 or distributed across the control system 16 and the one or more processing nodes 32 in any desired manner. In some particular embodiments, some or all of the functions 42 of the radio access node 12 described herein are implemented as virtual components executed by one or more virtual machines implemented in a virtual environment(s) hosted by the processing node(s) 32. As will be appreciated by one of ordinary skill in the art, additional signaling or communication between the processing node(s) 32 and the control system 16 is used in order to carry out at least some of the desired functions 42. Notably, in some embodiments, the control system 16 may not be included, in which case the radio unit(s) 24 communicate directly with the processing node(s) 32 via an appropriate network interface(s).

In some embodiments, a computer program including instructions which, when executed by at least one processor, causes the at least one processor to carry out the functionality of a radio access node 12 or a node (e.g., a processing node 32) implementing one or more of the functions 42 of the radio access node 12 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 19:
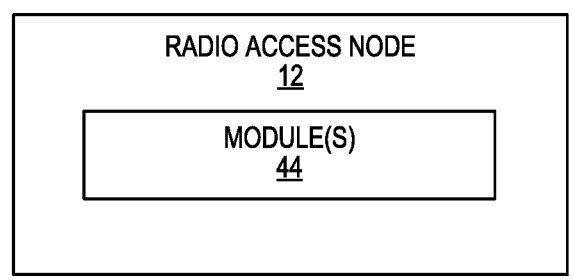

FIG. 19 is a schematic block diagram of the radio access node 12 according to some other embodiments of the present disclosure. The radio access node 12 includes one or more modules 44, each of which is implemented in software. The module(s) 44 provide the functionality of the radio access node 12 described herein. This discussion is equally applicable to the processing node 32 of FIG. 18 where the modules 44 may be implemented at one of the processing nodes 32 or distributed across multiple processing nodes 32 and/or distributed across the processing node(s) 32 and the control system 16.

Figure 20:
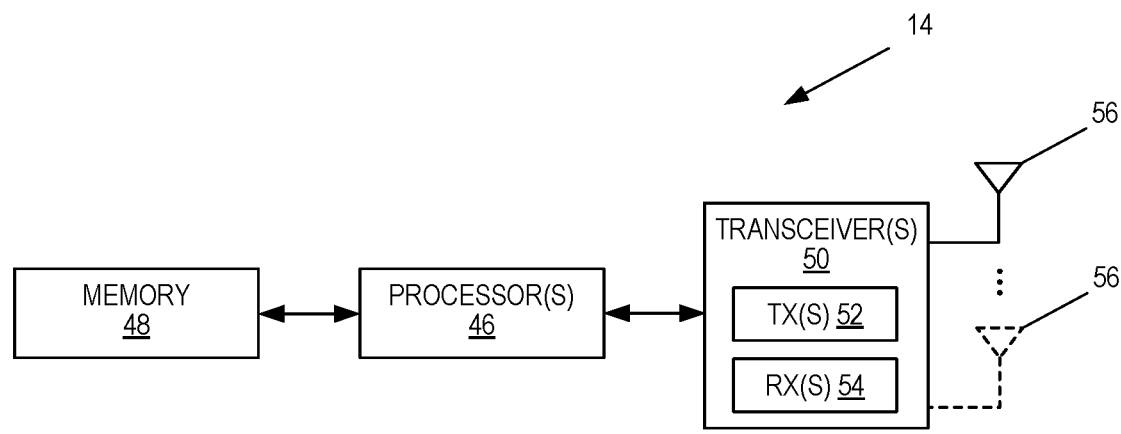
FIGS. 20 and 21 illustrate embodiments of a wireless device.

FIG. 20 is a schematic block diagram of a wireless device 14 according to some embodiments of the present disclosure. As illustrated, the wireless device 14 includes one or more processors 46 (e.g., CPUs, ASICs, FPGAs, and/or the like), memory 48, and one or more transceivers 50 each including one or more transmitters 52 and one or more receivers 54 coupled to one or more antennas 56. In some embodiments, the functionality of the wireless device 14 described above may be fully or partially implemented in software that is, e.g., stored in the memory 48 and executed by the processor(s) 46.

In some embodiments, a computer program including instructions which, when executed by at least one processor, causes the at least one processor to carry out the functionality of the wireless device 14 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 21:
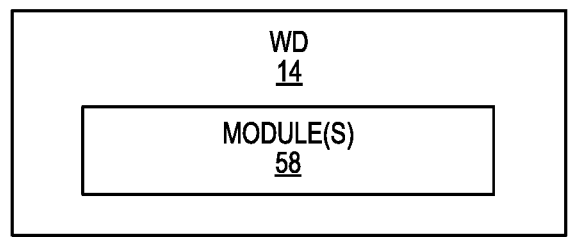

FIG. 21 is a schematic block diagram of the wireless device 14 according to some other embodiments of the present disclosure. The wireless device 14 includes one or more modules 58, each of which is implemented in software. The module(s) 58 provide the functionality of the wireless device 14 described herein.

While not being limited thereto, some example embodiments of the present disclosure are provided below.

Embodiment 1: A method of operation of a wireless device (14) in a cellular communications network (10), comprising: determining (104) a downlink HARQ timing k for transmission of downlink HARQ feedback for a downlink transmission received in a downlink sTTI n based on a TDD uplink/downlink configuration; and transmitting (108), in an uplink sTTI n+k, downlink HARQ feedback for the downlink transmission received in the sTTI n.

Embodiment 2: The method of embodiment 1 wherein the downlink HARQ timing k is a smallest integer number of sTTIs that is larger than or equal to a predefined minimum downlink HARQ timing value such that sTTI n+k is an uplink sTTI.

Embodiment 3: The method of any one of embodiments 1 or 2 wherein determining (104) the downlink HARQ timing k comprises determining (104) the downlink HARQ timing k in such a manner that an uplink part of special SFs are treated as uplink sTTIs.

Embodiment 4: The method of any one of embodiments 1 or 2 wherein determining (104) the downlink HARQ timing k comprises determining (104) the downlink HARQ timing k in such a manner that an uplink part of special SFs are not treated as uplink sTTIs.

Embodiment 5: The method of any one of embodiments 1 to 4 wherein determining (104) the downlink HARQ timing k comprises determining (104) the downlink HARQ timing k in such a manner that an uplink part of special SFs are not treated as uplink sTTIs.

Embodiment 6: The method of any one of embodiments 1 to 4 wherein determining (104) the downlink HARQ timing k comprises determining (104) the downlink HARQ timing k in accordance with a latency optimization scheme.

Embodiment 7: The method of any one of embodiments 1 to 4 wherein determining (104) the downlink HARQ timing k comprises determining (104) the downlink HARQ timing k in accordance with a load balancing scheme.

Embodiment 8: The method of embodiment 1 or 2 wherein determining (104) the downlink HARQ timing k comprises determining (104) the downlink HARQ timing k based on a predefined table that defines values of k for different values of n for the TDD uplink/downlink configuration.

Embodiment 9: The method of embodiment 8 wherein the predefined table defines the values of k for the different values of n for the TDD uplink/downlink configuration in such a manner that an uplink part of special SFs are treated as uplink sTTIs.

Embodiment 10: The method of embodiment 8 wherein the predefined table defines the values of k for the different values of n for the TDD uplink/downlink configuration in such a manner that an uplink part of special SFs are not treated as uplink sTTIs.

Embodiment 11: The method of any one of embodiments 8 to 10 wherein the predefined table defines the values of k for the different values of n in accordance with a latency optimization scheme.

Embodiment 12: The method of any one of embodiments 8 to 10 wherein the predefined table defines the values of k for the different values of n in accordance with a load sharing scheme.

Embodiment 13: The method of any one of the preceding embodiments wherein an uplink sTTI can carry downlink HARQ feedback for the downlink transmission received in multiple sTTIs.

Embodiment 14: A wireless device (14) in a cellular communications network (10), the wireless device (14) adapted to: determine a downlink HARQ timing k for transmission of downlink HARQ feedback for a downlink transmission received in a downlink sTTI n based on a TDD uplink/downlink configuration; and transmit, in an uplink sTTI n+k, downlink HARQ feedback for the downlink transmission received in the downlink sTTI n.

Embodiment 15: The wireless device (14) of embodiment 14 wherein the wireless device (14) is further adapted to perform the method of any one of embodiments 2 to 13.

Embodiment 16: A wireless device (14) in a cellular communications network (10), comprising: at least one transceiver (50); at least one processor (46); and memory (48) comprising instructions executable by the at least one processor (46) whereby the wireless device (14) is operable to: determine a downlink HARQ timing k for transmission of downlink HARQ feedback for a downlink transmission received in a downlink sTTI n based on a TDD uplink/downlink configuration; and transmit, in an uplink sTTI n+k, downlink HARQ feedback for the transmission received in the downlink sTTI n.

Embodiment 17: A wireless device (14) in a cellular communications network (10), the wireless device (14) comprising: a determining module (58) operable to determine a downlink HARQ timing k for transmission of downlink HARQ feedback for a downlink transmission received in a downlink sTTI n based on a TDD uplink/downlink configuration; and a transmitting module (58) operable to transmit, in an uplink sTTI n+k, downlink HARQ feedback for the downlink transmission received in the downlink sTTI n.

Embodiment 18: A method of operation of a radio access node (12) in a cellular communications network (10), comprising: transmitting (102) a downlink transmission to a wireless device (14) in a downlink sTTI n; determining (106), based on a TDD uplink/downlink configuration, a downlink HARQ timing k for reception of downlink HARQ feedback from the wireless device (14) for the downlink transmission transmitted in the downlink sTTI n; and receiving (108), in an uplink sTTI n+k, downlink HARQ feedback from the wireless device (14) for the downlink transmission transmitted to the wireless device (14) in the downlink sTTI n.

The following acronyms are used throughout this disclosure.
3GPP Third Generation Partnership Project
5G Fifth Generation
ASIC Application Specific Integrated Circuit
BLER Block Error Rate
CA Carrier Aggregation
CN Core Network
CPU Central Processing Unit
DwPTS Downlink Part of a Special Subframe
eNB Enhanced or Evolved Node B
FDD Frequency Division Duplexing
FPGA Field Programmable Gate Array
FS Frame Structure
GP Guard Period
HARQ Hybrid Automatic Repeat Request
HTTP Hypertext Transfer Protocol
LAA License Assisted Access
LTE Long Term Evolution
MME Mobility Management Entity
ms Millisecond
MTC Machine Type Communication
OFDM Orthogonal Frequency Division Multiplexing
PDN Packet Data Network
P-GW Packet Data Network Gateway
PHICH Physical Hybrid Automatic Repeat Request Indicator Channel
RAT Radio Access Technology
SCEF Service Capability Exposure Function
SC-FDMA Single Carrier Frequency Division Multiple Access
SF Subframe
SIB System Information Block
sPUCCH Short Physical Uplink Control Channel
sPUSCH Short Physical Uplink Shared Channel
sTTI Short Transmission Time Interval
TCP Transmission Control Protocol
TDD Time Division Duplexing
TS Technical Specification
TTI Transmission Time Interval
UE User Equipment
UpPTS Uplink Part of a Special Subframe Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device in an LTE cellular communications network, comprising:
   determining a downlink Hybrid Automatic Repeat Request, HARQ, timing k for transmission of downlink HARQ feedback for each downlink transmission received in a downlink short Transmission Time Interval, sTTI, $n_{DL}$ based on one of seven Time Division Duplexing, TDD, uplink/downlink configurations as being defined at least in Third-Generation Partnership Project, 3GPP, TS 36.211; and
   transmitting, in an uplink sTTI $n_{DL}$+k, the downlink HARQ feedback for the downlink transmissions received in the downlink sTTI $n_{DL}$,
   the downlink HARQ feedback being equally distributed over plural uplink sTTIs in the frame, not more than four downlink HARQ feedback bits being sent in a single uplink sTTI and spatial bundling being applied to the HARQ feedback bits in each single uplink sTTI.

2. The method of claim 1 wherein determining the downlink HARQ timing k comprises determining the downlink HARQ timing k in such a manner that an uplink part of special subframes are treated as uplink sTTIs.

3. The method of claim 1 wherein determining the downlink HARQ timing k comprises determining the downlink HARQ timing k in such a manner that an uplink part of special subframes are not treated as uplink sTTIs when the TDD uplink/downlink configuration is any one of TDD uplink/downlink configuration 0-4 and 6.

4. The method of claim 1 wherein determining the downlink HARQ timing k comprises determining the downlink HARQ timing k based on a predefined table that defines values of k for different values of $n_{DL}$ for the TDD uplink/downlink configuration.

5. The method of claim 4 wherein the predefined table defines the values of k for the different values of $n_{DL}$ for the TDD uplink/downlink configuration in such a manner that an uplink part of special subframes are treated as uplink sTTIs when the TDD uplink/downlink configuration is any of TDD uplink/downlink configuration 0-4 and 6.

6. The method of claim 4 wherein the predefined table defines the values of k for the different values of $n_{DL}$ for the TDD uplink/downlink configuration in such a manner that an uplink part of special subframes are not treated as uplink sTTIs when the TDD uplink/downlink configuration is any of TDD uplink/downlink configuration 0-4 and 6.

7. The method of claim 1 wherein the downlink sTTI $n_{DL}$ and the uplink sTTI $n_{DL}+k$ each have a duration of less than 1 millisecond.

8. The method of claim 1 wherein the downlink sTTI $n_{DL}$ and the uplink sTTI $n_{DL}+k$ each have a duration of less than 0.5 milliseconds.

9. A wireless device for an LTE cellular communications network, comprising:
   at least one transceiver;
   at least one processor; and
   memory comprising instructions executable by the at least one processor whereby the wireless device is operable to:
      determine a downlink Hybrid Automatic Repeat Request, HARQ, timing k for transmission of downlink HARQ feedback for each downlink transmission received in a downlink short Transmission Time Interval, sTTI, $n_{DL}$ based on one of seven Time Division Duplexing, TDD, uplink/downlink configurations as being defined at least in Third-Generation Partnership Project, 3GPP, TS 36.211; and
      transmit, in an uplink sTTI $n_{DL}+k$, downlink HARQ feedback for the transmissions received in the downlink sTTI $n_{DL}$,
      the downlink HARQ feedback being equally distributed over plural uplink sTTIs in the frame, not more than four downlink HARQ feedback bits being sent in a single uplink sTTI and spatial bundling being applied to the HARQ feedback bits in each single uplink sTTI.

10. A method of operation of a radio access node in an LTE cellular communications network, comprising:
   transmitting a downlink transmissions to a wireless device in a frame composed of plural downlink short Transmission Time Intervals, sTTIs, $n_{DL}$;
   determining, based on one of seven Time Division Duplexing, TDD, uplink/downlink configurations as being defined at least in Third-Generation Partnership Project, 3GPP, TS 36.211, a downlink Hybrid Automatic Repeat Request, HARQ, timing k for reception of downlink HARQ feedback from the wireless device for the downlink transmissions transmitted in the downlink sTTIs $n_{DL}$; and
   receiving, in an uplink sTTI $n_{DL}+k$, downlink HARQ feedback from the wireless device for the downlink transmissions transmitted to the wireless device in the downlink sTTIs $n_{DL}$,
   the downlink HARQ feedback being equally distributed over plural uplink sTTIs in the frame, not more than four downlink HARQ feedback bits being sent in a single uplink sTTI and spatial bundling being applied to the HARQ feedback bits in each single uplink sTTI.

11. An LTE cellular communication network comprising a wireless device and a radio access node, the radio access node comprising:
   at least one transceiver;
   at least one processor; and
   memory comprising instructions executable by the at least one processor whereby the radio access node is operable to:
      transmit a downlink transmissions to the wireless device in downlink short Transmission Time Intervals, sTTIs, $n_{DL}$;
      determine, based on one of seven Time Division Duplexing, TDD, uplink/downlink configurations as being defined at least in Third-Generation Partnership Project, 3GPP, TS 36.211, a downlink Hybrid Automatic Repeat Request, HARQ, timing k for reception of downlink HARQ feedback from the wireless device for the downlink transmissions transmitted in the downlink sTTIs $n_{DL}$; and
      receive, in an uplink sTTI $n_{DL}+k$, downlink HARQ feedback from the wireless device for the downlink transmissions transmitted to the wireless device in the downlink sTTIs $n_{DL}$,
      the downlink HARQ feedback being equally distributed over plural uplink sTTIs in the frame, not more than four downlink HARQ feedback bits being sent in a single uplink sTTI and spatial bundling being applied to the HARQ feedback bits in each single uplink sTTI.

* * * * *